(12) United States Patent
Sukeno et al.

(10) Patent No.: US 7,525,557 B2
(45) Date of Patent: Apr. 28, 2009

(54) MOVING IMAGE COMPOSITION DEVICE, MOVING IMAGE COMPOSITION METHOD, AND INFORMATION TERMINAL WITH MOVING IMAGE COMPOSITION FUNCTION

(75) Inventors: Junji Sukeno, Tokyo (JP); Tomonori Fukuta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 553 days.

(21) Appl. No.: 10/541,028

(22) PCT Filed: Jan. 15, 2004

(86) PCT No.: PCT/JP2004/000221

§ 371 (c)(1),
(2), (4) Date: Jun. 28, 2005

(87) PCT Pub. No.: WO2004/073300

PCT Pub. Date: Aug. 26, 2004

(65) Prior Publication Data

US 2006/0170692 A1  Aug. 3, 2006

(30) Foreign Application Priority Data

Feb. 14, 2003 (JP) ............................. 2003-036004

(51) Int. Cl.
*G09G 5/00* (2006.01)
(52) U.S. Cl. ............................. 345/629; 386/1; 386/46; 715/201
(58) Field of Classification Search .................. 345/629
See application file for complete search history.

(56) References Cited

U.S. PATENT DOCUMENTS

| 5,883,610 | A | * | 3/1999 | Jeon ............................. 345/629 |
| 5,926,187 | A | * | 7/1999 | Kim ............................. 345/629 |
| 6,067,092 | A | * | 5/2000 | Rinaldi et al. ................ 345/629 |
| 6,204,840 | B1 | * | 3/2001 | Petelycky et al. ............ 715/202 |
| 6,657,637 | B1 | * | 12/2003 | Inagaki et al. ................ 345/629 |
| 6,927,783 | B1 | * | 8/2005 | MacInnis et al. ............. 345/629 |
| 7,010,492 | B1 | * | 3/2006 | Bassett et al. .................. 705/1 |
| 7,058,654 | B1 | * | 6/2006 | Burke ......................... 707/102 |
| 7,133,598 | B1 | * | 11/2006 | Lin et al. ...................... 386/109 |
| 7,139,014 | B1 | * | 11/2006 | Kim et al. ................... 348/14.01 |
| 2002/0122045 | A1 | * | 9/2002 | WOODSON et al. ........ 345/611 |
| 2003/0011715 | A1 | * | 1/2003 | Kastelic ....................... 348/589 |

(Continued)

FOREIGN PATENT DOCUMENTS

JP  5-143710 A  6/1993

(Continued)

*Primary Examiner*—Xiao M. Wu
*Assistant Examiner*—David H Chu
(74) *Attorney, Agent, or Firm*—Birch, Stewart, Kolasch & Birch, LLP

(57) ABSTRACT

One of a plurality of items of control-data-for-synthesis (G2C) is read from a storage (3) at a timing based on a moving-image control signal (G1C), an image-data-for-synthesis (G2G) associated with the read control-data-for-synthesis (G2C) is read from the storage (3) in accordance with the read control-data-for-synthesis (G2C), and processing to synthesize one frame of the moving-image data (G1G) and the read image-data-for-synthesis (G2G) is performed. These processing steps are repeated to produce composite moving-image data (G3G).

15 Claims, 11 Drawing Sheets

U.S. PATENT DOCUMENTS

| | | | |
|---|---|---|---|
| 2003/0146915 A1* | 8/2003 | Brook et al. | 345/473 |
| 2004/0027369 A1* | 2/2004 | Kellock et al. | 345/716 |
| 2004/0031058 A1* | 2/2004 | Reisman | 725/112 |
| 2005/0031092 A1* | 2/2005 | Umemura et al. | 379/88.13 |

FOREIGN PATENT DOCUMENTS

| | | |
|---|---|---|
| JP | 7-44850 U | 11/1995 |
| JP | 8-139994 A | 5/1996 |
| JP | 9-311946 A | 12/1997 |
| JP | 10-210364 A | 8/1998 |
| JP | 11-259685 A | 9/1999 |
| JP | 2000-98999 A | 4/2000 |
| JP | 2000-175166 A | 6/2000 |
| JP | 2000-341587 A | 12/2000 |
| JP | 2001-256508 A | 9/2001 |
| JP | 2002-223389 A | 8/2002 |
| JP | 2002-366970 A | 12/2002 |
| JP | 2003-44031 A | 2/2003 |

* cited by examiner

MOVING IMAGE COMPOSITION DEVICE, MOVING IMAGE COMPOSITION METHOD, AND INFORMATION TERMINAL WITH MOVING IMAGE COMPOSITION FUNCTION

TECHNICAL FIELD

The present invention relates to a moving-image synthesis device and a moving-image synthesis method for producing composite moving-image data by synthesizing (that is, "moving-image overlaying" or "animation overlaying") image-data-for-synthesis such as graphics image data and input moving-image data in real time, and an information terminal apparatus with a moving-image synthesis function such as a videophone apparatus.

BACKGROUND ART

A conventional telephone equipped with a camera has a function to select one of previously stored graphics still images and overlay (that is, "still-image overlay") the selected graphics still image on a still image newly taken by the camera.

Further, Japanese Patent Kokai (Laid-open) Publication No. 2000-175166 discloses a videophone apparatus which can send and receive a moving-image and voice. This videophone apparatus has a hide function which prevents the other party from becoming aware of the whereabouts of a human figure (sender) by overlaying (that is, "still-image overlaying") a still image on the background of the human figure (sender) taken by the image pickup device to make it hard to identify the background or by replacing the background with a still image.

However, the above-described conventional telephone equipped with a camera can just overlay a still image provided in advance on a still image newly taken by the camera, and cannot send or receive a moving-image.

Further, the above-described conventional videophone apparatus has a function to send and receive a moving-image, but when the hide function is used, a part of a sent composite image becomes a still image. Therefore, there is a problem that a part of the function to send a moving-image is wasted (that is, the function to send a moving-image is not put into full use).

Accordingly, an object of the present invention is to provide a moving-image synthesis device, a moving-image synthesis method, and an information terminal apparatus with a moving-image synthesis function, which can generate composite moving-image data to provide a full moving-image by synthesizing image-data-for-synthesis (that is, "data for moving-image overlay") and the input moving-image data in real time.

DISCLOSURE OF INVENTION

A moving-image synthesis device of the present invention includes a synthesis processor which receives a video signal, which includes moving-image data and a moving-image control signal including display timing information of each frame of the moving-image data; and a storage which stores data-for-synthesis, which includes a plurality of items of image-data-for-synthesis and a plurality of items of control-data-for-synthesis associated with the plurality of items of the image-data-for-synthesis. The synthesis processor reads one of the plurality of items of the control-data-for-synthesis from the storage at a timing based on the moving-image control signal; reads the image-data-for-synthesis associated with the read control-data-for-synthesis from the storage in accordance with the read control-data-for-synthesis; executes processing to synthesize one frame of the moving-image data and the read image-data-for-synthesis; and repeats these processing steps to produce composite moving-image data.

BEST MODE FOR CARRYING OUT THE INVENTION

Embodiments of the present invention will be described below in detail with reference to the accompanying drawings.

FIRST EMBODIMENT

Figure 1:
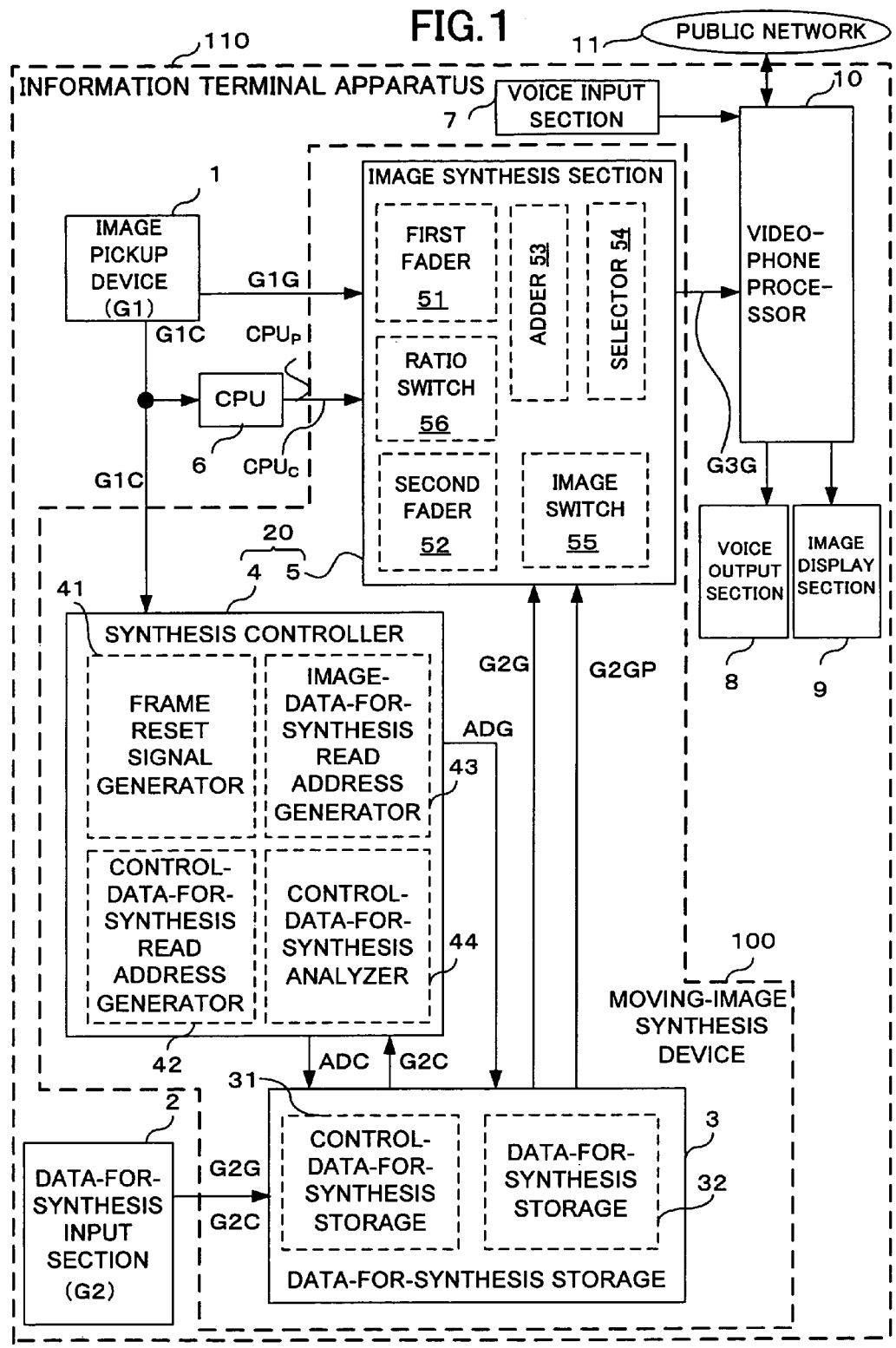
FIG. 1 is a block diagram showing a configuration of a moving-image synthesis device and an information terminal apparatus with a moving-image synthesis function, of a first embodiment of the present invention.

FIG. 1 is a block diagram showing a configuration of a moving-image synthesis device 100 (a device which can implement a moving-image synthesis method of the present invention) and an information terminal apparatus 110 with a moving-image synthesis function, of a first embodiment of the present invention. The information terminal apparatus 110 is a cellular phone with a videophone function, for example.

As shown in FIG. 1, the information terminal apparatus 110 includes the moving-image synthesis device 100, an image pickup device 1, a data-for-synthesis input section 2, a CPU 6, a voice input section 7, a voice output section 8, an image display section 9, and a videophone processor 10 which has a function to communicate through a public network 11.

Further, as shown in FIG. 1, the moving-image synthesis device 100 includes a data-for-synthesis storage 3, a synthesis controller 4, and an image synthesis section 5. The synthesis controller 4 and the image synthesis section 5 compose a synthesis processor 20 which carries out the processing to synthesize (that is, "moving-image overlay") image-data-for-synthesis G2G and moving-image data G1G. The moving-image synthesis device 100 is configured by semiconductor integrated circuitry, for example.

The image pickup device 1 is a camera, for example, and generates a video signal G1 including moving-image data G1G and moving-image control signal G1C accompanying therewith. The generated video signal G1 is separated into the moving-image data G1G, which is a portion of data actually displayed as an image, and the moving-image control signal G1C, which is a control data portion, and supplied to the moving-image synthesis device 100. The moving-image control signal G1C is supplied to the CPU 6 as well.

The data-for-synthesis input section 2 is connected to a serial communication line (not shown) conforming to a standard such as RS-232C and USB or connected directly to a CPU bus line (not shown), and inputs data-for-synthesis G2 to the moving-image synthesis device 100. The data-for-synthesis G2 includes image-data-for-synthesis G2G which is a part of data actually displayed as an image, and control-data-for-synthesis G2C which forms sequence data.

The data-for-synthesis storage 3 is an element for storing the data-for-synthesis G2 supplied from the data-for-synthesis input section 2, and will be described later in further detail with reference to FIG. 2.

The synthesis controller 4 is an element for controlling the synthesis processing of the moving-image data G1G and the image-data-for-synthesis G2G in accordance with the moving-image control signal G1C contained in the video signal G1 and the control-data-for-synthesis G2C contained in the data-for-synthesis G2, and will be described later in further detail with reference to FIG. 3.

The image synthesis section 5 is an element for synthesizing the moving-image data G1G input from the image pickup device 1 and the image-data-for-synthesis G2G read from the data-for-synthesis storage 3 in accordance with the control-data-for-synthesis G2C read from the data-for-synthesis storage 3 and a control signal from the CPU 6, which will be described later, and will be described later in further detail with reference to FIG. 5.

The CPU (central processing unit) 6 is an arithmetic unit containing a processing element such as a microprocessor and peripheral circuitry such as a register for outputting a control signal predetermined for image synthesis at a timing given by the moving-image control signal G1C. The CPU 6 generates a moving-image ratio control signal which is parameter data indicating a ratio of the moving-image in image synthesis, an image-for-synthesis ratio control signal which is parameter data indicating a ratio of an image-for-synthesis, and a control signal containing a switch control signal $CPU_c$, in accordance with the input moving-image control signal G1C, and outputs the signals to the image synthesis section 5. In FIG. 1, the moving-image ratio control signal, the image-for-synthesis ratio control signal, a moving-image selection control signal, and an image-for-synthesis selection control signal are collectively expressed as $CPU_p$.

The voice input section 7 includes a microphone or the like, and generates an audio signal in accordance with the input voice. The voice output section 8 includes a speaker or the like, and outputs a sound in accordance with the input audio signal. The image display section 9 is a liquid crystal display section, for example, and displays an image based on the composite moving-image data G3G synthesized by the image synthesis section 5, an image based on the moving-image data received by the videophone processor 10, which will be described later, or the like.

The videophone processor 10 compresses the composite moving-image data G3G synthesized by the image synthesis section 5 into a videophone image signal and sends the videophone image signal to the other party, together with the audio signal input from the voice input section 7. The videophone processor 10 also decompresses a signal received from the other party into a videophone image signal and an audio signal and causes an image to be displayed by the image display section 9 and voice to be output from the voice output section 8. The public network 11 is a communication network such as cellular phone channels, wired telephone channels, and the like.

Figure 2:
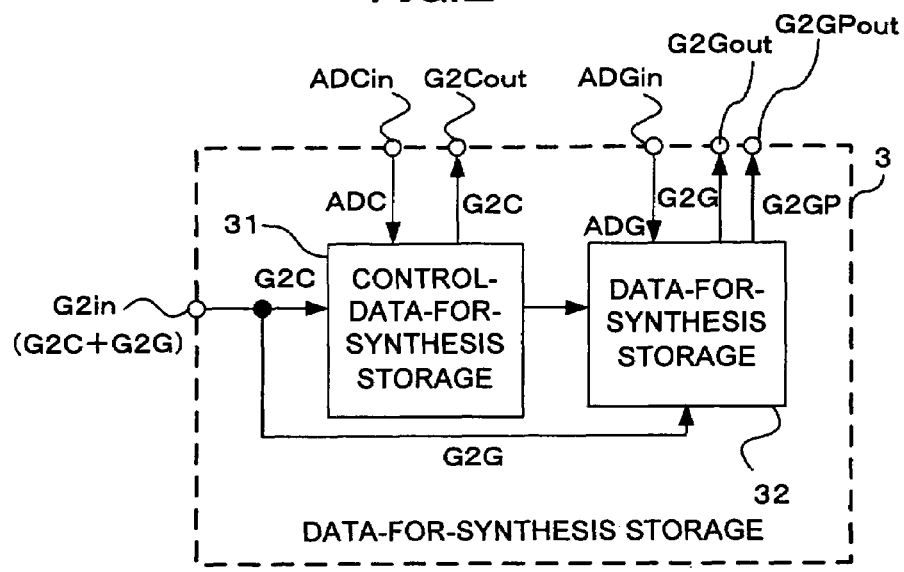
FIG. 2 is a block diagram showing a detailed configuration of the data-for-synthesis storage shown in FIG. 1.

FIG. 2 is a block diagram showing a detailed configuration of the data-for-synthesis storage 3 shown in FIG. 1.

A control-data-for-synthesis storage 31 stores the control-data-for-synthesis G2C forming sequence data, out of the data-for-synthesis G2 input from an input terminal $G2_{in}$ of the data-for-synthesis storage 3. The control-data-for-synthesis storage 31 outputs the control-data-for-synthesis G2C at the address specified by the read address information input from the input terminal $ADC_{in}$ of the data-for-synthesis storage 3, from an output terminal $G2C_{out}$ of the data-for-synthesis storage 3.

An image-data-for-synthesis storage 32 stores the image-data-for-synthesis G2G, which is a part of data to be displayed as an actual image, out of the data-for-synthesis G2 input from the input terminal $G2_{in}$ of the data-for-synthesis storage 3. The image-data-for-synthesis storage 32 outputs the image-data-for-synthesis G2G at the address specified by the read address information input from the input terminal $ADG_{in}$ of the data-for-synthesis storage 3, from an output terminal $G2G_{out}$ of the data-for-synthesis storage 3, and also outputs parameter data $G2G_p$ such as synthesis conditions and a synthesis ratio parameter of the image-data-for-synthesis G2G, from an output terminal $G2GP_{out}$ of the data-for-synthesis storage 3.

Figure 3:
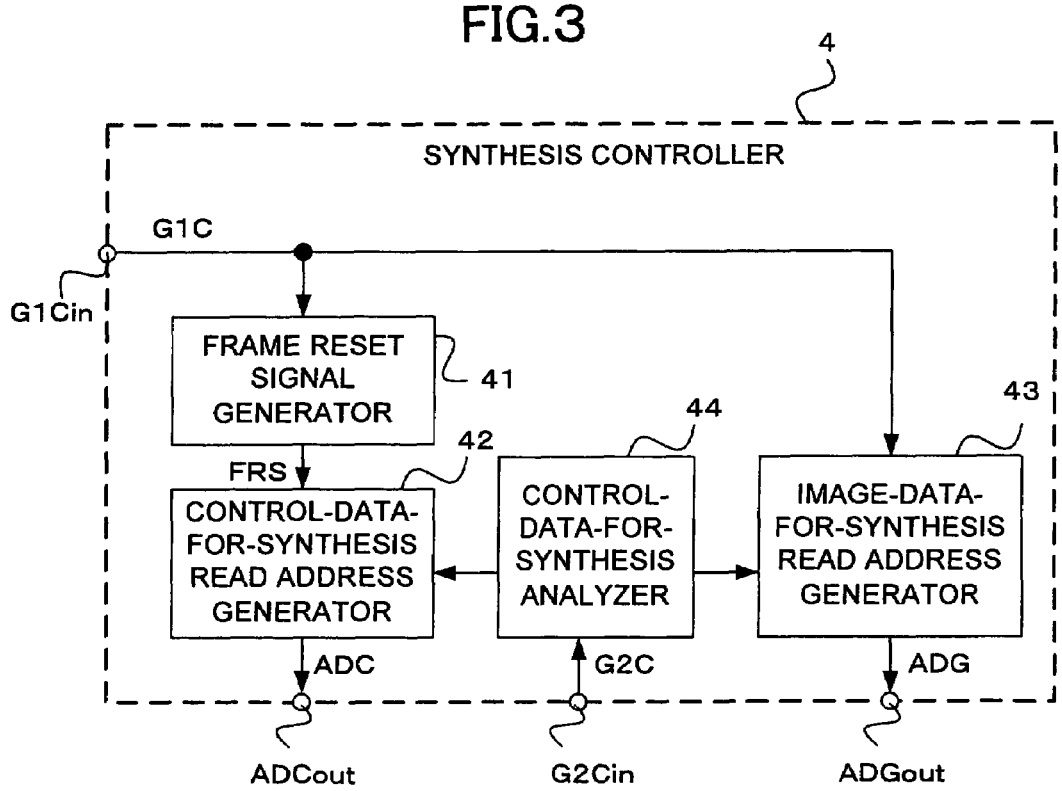
FIG. 3 is a block diagram showing a detailed configuration of the synthesis controller shown in FIG. 1.

FIG. 3 is a block diagram showing a detailed configuration of the synthesis controller 4 shown in FIG. 1.

The moving-image control signal G1C is a signal accompanying the moving-image data G1G input from the image pickup device 1, and includes a clock, a horizontal synchronization signal, a vertical synchronization signal, and a moving-image parameter. A frame reset signal generator 41 generates a frame reset signal FRS, which indicates the beginning of a frame, from the moving-image control signal G1C input from an input terminal $G1C_{in}$ of the synthesis controller 4.

A control-data-for-synthesis read address generator 42 generates a control data read address ADC based on the information given by a control-data-for-synthesis analyzer 44 at the timing of the frame reset signal FRS output from the frame reset signal generator 41, and outputs the address from an output terminal $ADC_{out}$ of the synthesis controller 4.

An image-data-for-synthesis read address generator 43 generates an image data read address ADG based on the moving-image control signal G1C input from the input terminal $G1C_{in}$ of the synthesis controller 4 and the information given by the control-data-for-synthesis analyzer 44, which will be described later, and outputs the address from an output terminal $ADG_{out}$ of the synthesis controller 4.

The control-data-for-synthesis analyzer 44 analyzes the control-data-for-synthesis G2C (header), which is read at the control data read address ADC by the control-data-for-synthesis storage 31 and input from the input terminal G2C$_{in}$ of the synthesis controller 4, and outputs analyzed information to the control-data-for-synthesis read address generator 42 and the image-data-for-synthesis read address generator 43.

Figure 4:
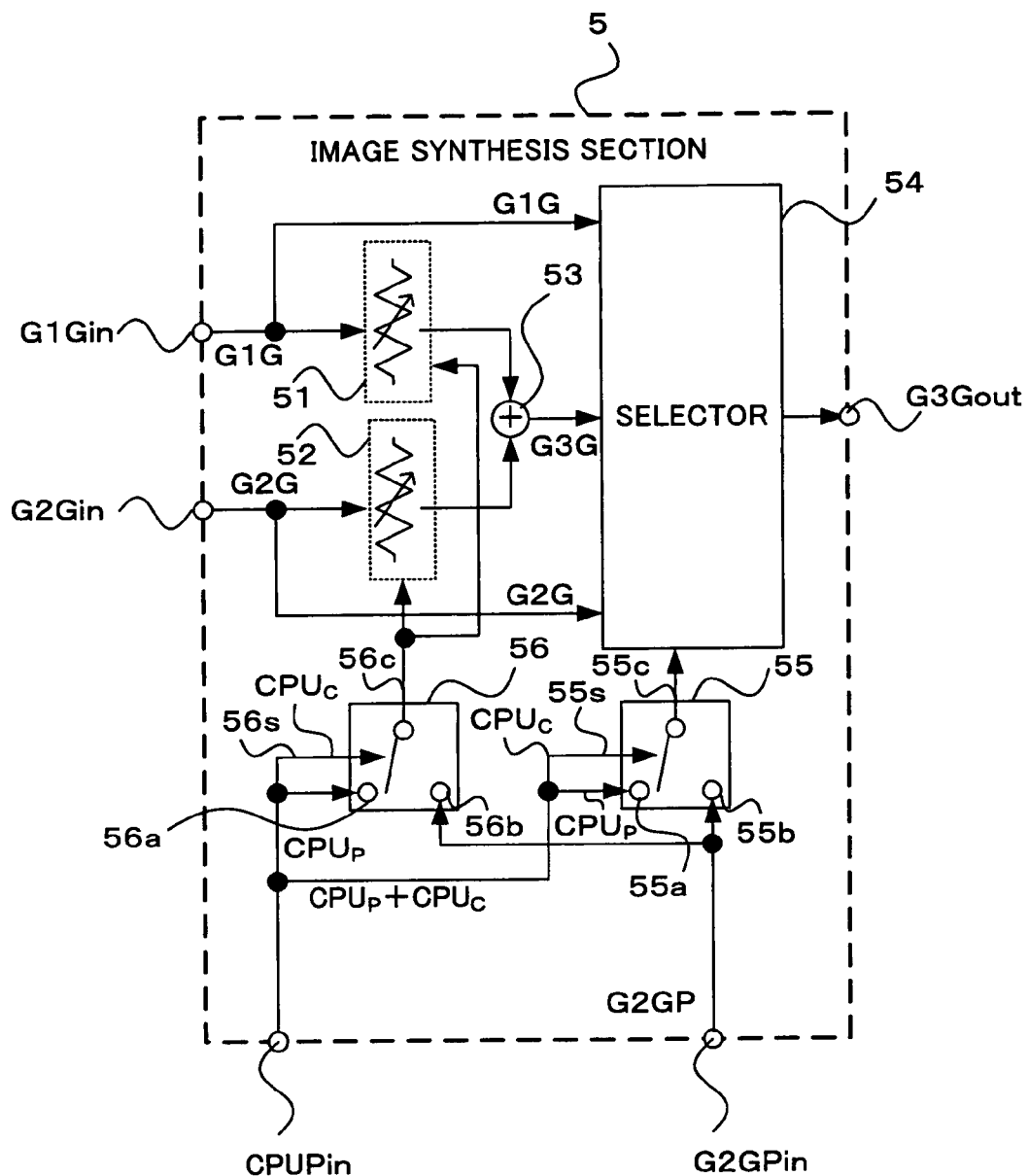
FIG. 4 is a block diagram showing a detailed configuration of the image synthesis section shown in FIG. 1.

FIG. 4 is a block diagram showing a detailed configuration of the image synthesis section 5 shown in FIG. 1.

A first fader 51 attenuates the amplitude of the moving-image data G1G, which is output from the image pickup device 1 and input through the input terminal G1G$_{in}$, of the image synthesis section 5. A second fader 52 attenuates the amplitude of the image-data-for-synthesis G2G, which is output from the data-for-synthesis storage 3 and input through the input terminal G2G$_{in}$, of the image synthesis section 5.

An adder 53 sums up the moving-image data G1G attenuated by the first fader 51 and the image-data-for-synthesis G2G attenuated by the second fader 52, and outputs composite moving-image data G3G.

A selector 54 selects the moving-image data G1G input from the input terminal G1G$_{in}$ of the image synthesis section 5, the image-data-for-synthesis G2G input from the input terminal G2G$_{in}$, of the image synthesis section 5, or the composite moving-image data G3G output from the adder 53, and outputs the selected data from an output terminal G3G$_{out}$ of the image synthesis section 5.

A switch 55 switches an image selection control signal to be output to the selector 54. The switch 55 changes its state in accordance with a switch control signal CPU$_c$, out of the control signals from the CPU 6. The switch 55 outputs to the selector 54, either the image selection control signal CPU$_P$ (a moving-image selection control signal, which is parameter data for selecting a moving-image, and an image-for-synthesis selection control signal, which is parameter data for selecting an image-for-synthesis), out of the control signals output from the CPU 6 and input through the input terminal CPUP$_{in}$ of the image synthesis section 5, or the moving-image selection control signal and the image-for-synthesis selection control signal, out of the control-data-for-synthesis G2G$_p$, which is parameter data output from the data-for-synthesis storage 3 and input through the input terminal G2GP$_{in}$ of the image synthesis section 5.

The switch 56 selects an image ratio control signal output to the first fader 51 and the second fader 52. The switch 56 changes its state in accordance with the switch control signal CPU$_c$ from the CPU 6. The switch 56 outputs to the first fader 51 and the second fader 52, either the image ratio control signal CPU$_p$ (a moving-image ratio control signal, which is parameter data about a ratio of the moving-image, and an image-for-synthesis ratio control signal, which is parameter data about a ratio of the image-for-synthesis), out of the control signals output from the CPU 6 and input through the input terminal CPUP$_{in}$ of the image synthesis section 5, or the moving-image ratio control signal and the image-for-synthesis ratio control signal, out of the control-data-for-synthesis G2G$_p$ output from the data-for-synthesis storage 3 and input through the input terminal G2GP$_{in}$ of the image synthesis section 5.

The operation of the first embodiment will be described below with reference to FIGS. 1 to 4.

The data-for-synthesis input section 2 was previously supplied with the data-for-synthesis G2, either through a serial communication means (not shown) conforming to a standard such as RS-232C and USB, or directly from the CPU bus (not shown). The data-for-synthesis G2 input from the data-for-synthesis input section 2 is supplied to the data-for-synthesis storage 3. The data-for-synthesis G2 is separated into the control-data-for-synthesis G2C and the image-data-for-synthesis G2G. Of the data-for-synthesis G2 input through the input terminal G2$_{in}$ to the data-for-synthesis storage 3, the control-data-for-synthesis G2C is stored in the control-data-for-synthesis storage 31, and the image-data-for-synthesis G2G is stored in the image-data-for-synthesis storage 32.

On the other hand, the moving-image data G1G in the video signal G1 output from the image pickup device 1 is input to the image synthesis section 5. At the same time, the moving-image control signal G1C, which is a control signal such as a clock, a horizontal synchronization signal, and a vertical synchronization signal, of the video signal G1 is input to the synthesis controller 4 and the CPU 6.

The moving-image control signal G1C is input through the input terminal G1C$_{in}$, of the synthesis controller 4 to the frame reset signal generator 41. The frame reset signal generator 41 catches the beginning of the vertical synchronization signal included in the moving-image control signal G1C to generate a frame reset signal FRS, for example. Therefore, the frame reset signal FRS becomes a signal representing the beginning of each frame. The frame reset signal FRS generated by the frame reset signal generator 41 is input to the control-data-for-synthesis read address generator 42. At a timing when the frame reset signal FRS is input, the control-data-for-synthesis read address generator 42 outputs the control data read address ADC of the data-for-synthesis G2, through the output terminal ADC$_{out}$ of the synthesis controller 4 to the data-for-synthesis storage 3. The control data read address ADC is generated on the basis of information provided by the control-data-for-synthesis analyzer 44 after analyzing the header (control-data-for-synthesis) of the data-for-synthesis G2 read in the previous frame.

The control data read address ADC output from the synthesis controller 4 is input through the input terminal ADC$_{in}$ to the control-data-for-synthesis storage 31 in the data-for-synthesis storage 3. The control-data-for-synthesis storage 31 reads a stored header (control-data-for-synthesis) in accordance with the input control data read address ADC, and outputs the header through the output terminal G2C$_{out}$ of the data-for-synthesis storage 3 to the synthesis controller 4. The data format and the header configuration of the header (control-data-for-synthesis) stored in the control-data-for-synthesis storage 31 will be described later with reference to FIG. 5 and FIG. 6.

The header (control-data-for-synthesis) read by the control-data-for-synthesis storage 31 in the data-for-synthesis storage 3 is input through the input terminal G2C$_{in}$, to the control-data-for-synthesis analyzer 44 in the synthesis controller 4. Of the information of analysis results of the control-data-for-synthesis analyzer 44, the leading address of the header portion of the next data-for-synthesis (address obtained from "the pointer information 3116 pointing at the next control-data-for-synthesis (header)" in FIG. 6, which will be described later) is output to the control-data-for-synthesis read address generator 42, and the information of the other parameters (information 3111 to 3115 and 3117 in FIG. 6, which will be described later, and the like) is output to the image-data-for-synthesis read address generator 43.

In accordance with the moving-image control signal G1C (a clock, horizontal and vertical synchronization signals, and the like) input from the image pickup device 1 through the input terminal G1C$_{in}$ of the synthesis controller 4 and the parameter information of analysis results of the control-data-for-synthesis analyzer 44, the image-data-for-synthesis read address generator 43 determines whether the data-for-synthesis storage 3 should obtain the image-data-for-synthesis G2G from the data-for-synthesis input section 2, so that the image synthesis section 5 can synthesize the moving-image data G1G from the image pickup device 1 and the image-data-for-synthesis G2G from the data-for-synthesis storage 3 in accordance with the parameters analyzed by the control-data-for-synthesis analyzer 44. If the image-data-for-synthesis G2G should be obtained, an acquisition request is output together with the image-data-for-synthesis read address ADG.

In the data-for-synthesis storage 3, the image-data-for-synthesis storage 32 receives the image-data-for-synthesis read address ADG and the data-for-synthesis acquisition request from the synthesis controller 4 through the input terminal $ADG_{in}$. The image-data-for-synthesis G2G is read from the address specified by the image-data-for-synthesis read address ADG of the image-data-for-synthesis storage 32, and output through the output terminal $G2G_{out}$ to the image synthesis section 5. If each pixel in the image-data-for-synthesis G2G has a data format including synthesis ratio parameters in the image synthesis section 5 (the moving-image ratio control signal and the image-for-synthesis ratio control signal), image selection parameters (the moving-image selection control signal and the image-for-synthesis selection control signal), and synthesis condition parameters and the like, these parameters G2GP are output through the output terminal $G2GP_{out}$ of the data-for-synthesis storage 3 to the image synthesis section 5.

As shown in FIG. 4, in the image synthesis section 5, the moving-image selection control signal and the image-for-synthesis selection control signal of the parameters (control-data-for-synthesis) G2GP are input through the input terminal $G2GP_{in}$ to the input portion 55b of the switch 55, and the moving-image ratio control signal and the image-for-synthesis ratio control signal of the parameters G2GP are input to the input portion 56b of the switch 56. The moving-image selection control signal and the image-for-synthesis selection control signal from a register or the like of the CPU 6 are input through the input terminal $CPUP_{in}$ to the input portion 55a of the switch 55; and the moving-image ratio control signal and the image-for-synthesis ratio control signal from a register or the like of the CPU 6 are input through the input terminal $CPUP_{in}$ to the input portion 56a of the switch 56. The CPU 6 supplies a control signal $CPU_c$ for selecting whether a control signal of either the input portion 55a or the input portion 55b is output to the output portion 55c of the switch 55, through the input terminal $CPUP_{in}$ to the control terminal 55s of the switch 55. The CPU 6 also supplies a control signal $CPU_c$ for selecting whether a control signal of either the input portion 56a or the input portion 56b of the switch 56 is output to the output portion 56c, through the input terminal $CPUP_{in}$ to the control terminal 56s of the switch 56.

Further, as shown in FIG. 4, the moving-image data G1G is supplied from the image pickup device 1, through the input terminal $G1G_{in}$, to the image synthesis section 5. Further, the image-data-for-synthesis G2G is supplied from the image-data-for-synthesis storage 32 in the data-for-synthesis storage 3, through the input terminal $G2G_{in}$, to the image synthesis section 5. The moving-image data G1G input from the input terminal $G1G_{in}$ of the image synthesis section 5 is supplied to the first fader 51 and the selector 54. Further, the image-data-for-synthesis G2G input from the input terminal $G2G_{in}$ of the image synthesis section 5 is supplied to the second fader 52 and the selector 54. The moving-image data G1G input to the first fader 51 is level-adjusted (attenuated) by the first fader 51 and supplied to the adder 53. Similarly, the image-data-for-synthesis G2G input to the second fader 52 is level-adjusted (attenuated) by the second fader 52 and supplied to the adder 53.

The first fader 51 and the second fader 52 are controlled in combination, and a control signal is output from the switch 56. The adder 53 sums up the output of the first fader 51 and the output of the second fader 52, and outputs the results to the selector 54. The selector 54 selects and outputs the moving-image data G1G input from the input terminal $G1G_{in}$, the image-data-for-synthesis G2G input from the input terminal $G2G_{in}$, or the composite moving-image data G3G of the moving-image data G1G and the image-data-for-synthesis G2G output from the adder 53, in accordance with the output of the switch 55. The output of the selector 54 is supplied through the output terminal $G3G_{out}$ to the videophone processor 10.

The videophone processor 10 compresses data from the image synthesis section 5 in a method defined by a standard such as an ITU-T (International Telecommunications Union-Telecommunication Standardization Sector) recommendation H.263 and an MPEG4 standard; carries out voice compression processing for the audio data input from the voice input section 7; and sends the compressed data to the public network 11, using a videophone communication procedure. Conversely, the compressed data from the public network 11 is separated into audio data and image data by the videophone processor 10, and is decompressed when necessary. The audio data is output to the voice output section 8, and the image data is output to the image display section 9.

The format of the control-data-for-synthesis (header) G2C of the control-data-for-synthesis storage 31 in the data-for-synthesis storage 3 will next be described.

Figure 5:
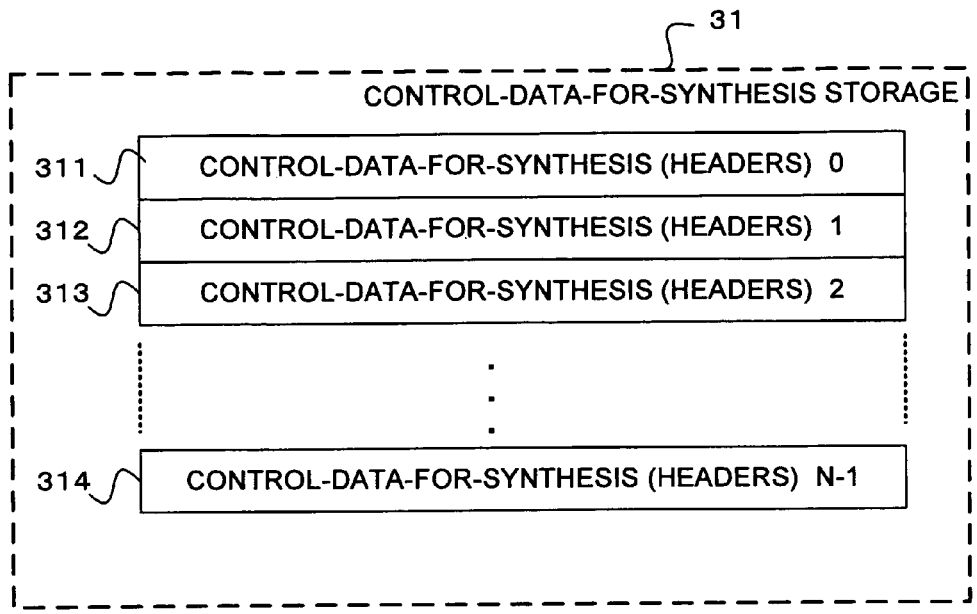
FIG. 5 is a diagram showing an example of a format of the control-data-for-synthesis stored in the control-data-for-synthesis storage shown in FIG. 2.

FIG. 5 is a diagram showing an example of a format of the control-data-for-synthesis stored in the control-data-for-synthesis storage 31 shown in FIG. 2.

The data format shown in FIG. 5 is composed of N items of the control-data-for-synthesis (headers) numbered by 0 to N−1 (N is a positive integer), denoted by reference numerals 311 to 314. The header represents the synthesis state of each frame when the image is varied in a given sequence.

Figure 6:
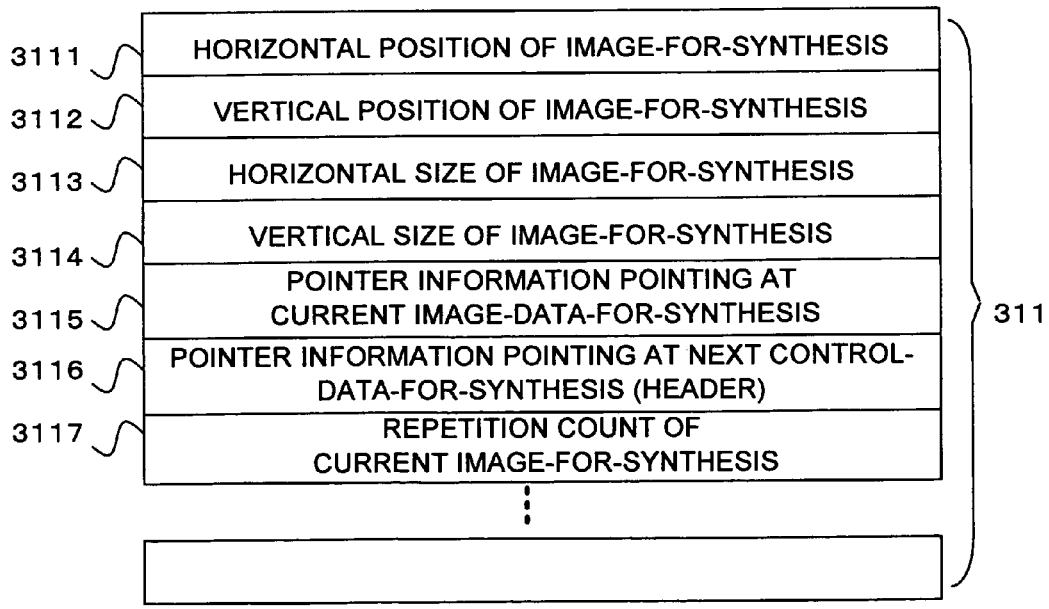
FIG. 6 is a diagram showing types of information stored in each control-data-for-synthesis item (header) shown in FIG. 5.

FIG. 6 is a diagram showing types of information stored in each item of the control-data-for-synthesis (header) shown in FIG. 5 (for example, control-data-for-synthesis 311).

The header shown in FIG. 6 is composed of parameters such as "a horizontal position 3111 of image-for-synthesis", "a vertical position 3112 of image-for-synthesis", "a horizontal size 3113 of image-for-synthesis", "a vertical size 3114 of image-for-synthesis", "pointer information 3115 pointing at the current image-data-for-synthesis", "pointer information 3116 pointing at the next control-data-for-synthesis (header)", and "a repetition count 3117 of current image-for-synthesis." Further, the structure of the control-data-for-synthesis G2C (header) is not limited to this structure. The structure of the control-data-for-synthesis may store the parameters in a different order, for example.

Figure 7:
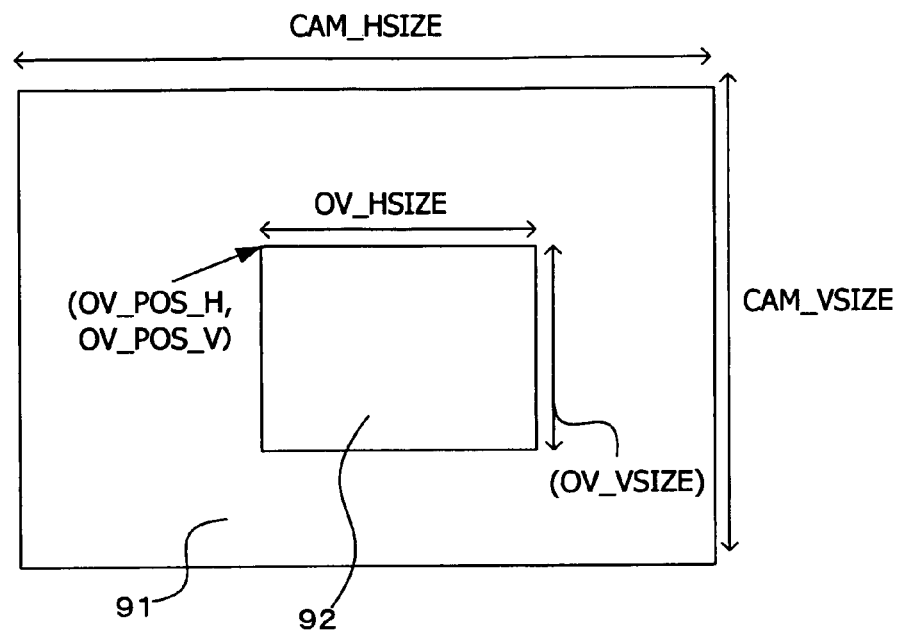
FIG. 7 is a diagram showing a relationship between the parameters shown in FIG. 6 and the display screen.

FIG. 7 is a diagram showing a relationship between the parameters composing the header shown in FIG. 6 and the display screen of a single frame of a composite moving-image.

The scanning of one frame of the taken moving-image 91 shown in FIG. 7 starts from the top left corner and ends in the bottom right corner of FIG. 7 (that is, horizontal scanning is carried out from left to right in FIG. 7, and vertical scanning is carried out from top to bottom in FIG. 7). "The horizontal position 3111 of image-for-synthesis" represents a position (horizontal position) where the top left-end pixel of the image-data-for-synthesis G2G of the image-for-synthesis 92 is superimposed (OV_POS_H in the figure), when the position (horizontal position) of the top left-end pixel of the moving-image data G1G is used as the reference (0). "The vertical position 3112 of image-for-synthesis" represents a position (vertical position) where the top left-end pixel of the image-data-for-synthesis G2G of the image-for-synthesis 92 is superimposed (OV_POS_V in the figure), when the position (vertical position) of the top left-end pixel of the moving-image data G1G is used as the reference (0). "The horizontal size 3113 of image-for-synthesis" represents the horizontal size (OV_HSIZE in the figure) of the image-data-for-synthesis G2G. "The vertical size 3114 of image-for-synthesis" represents the vertical size (OV_VSIZE in the figure) of the image-data-for-synthesis G2G.

The pointer information 3115 pointing at the current image-data-for-synthesis of the header represents the image-data-for-synthesis G2G corresponding to the header. Based on the pointer information 3115 pointing at the current image-data-for-synthesis, the address where the first data of the image-data-for-synthesis G2G is stored in the data-for-synthesis storage 3 can be obtained. Further, "the pointer information 3116 pointing at the next control-data-for-synthesis (header)" of the header points at the next header data. Based on the pointer information 3116 pointing at the next control-data-for-synthesis (header), the address where the first data of the next header data is stored can be obtained. The parameter for determining the header data to be referenced next (indicating the image-for-synthesis to be referenced next, based on the parameter of "The pointer information 3115 pointing at the current image-data-for-synthesis") is important when a plurality of items of the header data form a sequence.

"The repetition count 3117 of current image-for-synthesis" of the header indicates a repetition count of the image-data-for-synthesis G2G currently being used for synthesis processing of the image-data-for-synthesis G2G and the moving-image data G1G (number of repetition).

Figure 8:
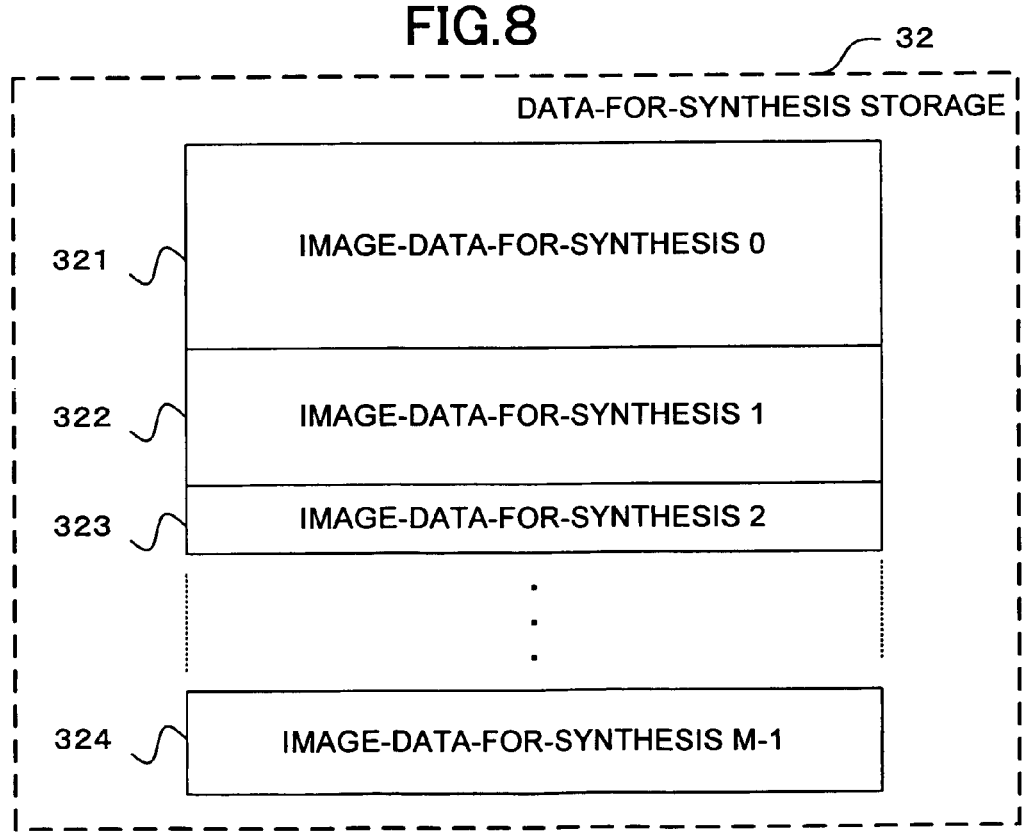
FIG. 8 is a diagram showing an example of a format of the image-data-for-synthesis stored in the image-data-for-synthesis storage shown in FIG. 2.

The format of the image data stored in the image-data-for-synthesis storage 32 of the data-for-synthesis storage 3 will next be described. FIG. 8 is a diagram showing an example of a format of the image-data-for-synthesis G2G stored in the image-data-for-synthesis storage 32.

The data format shown in FIG. 8 is composed of M items of the image-data-for-synthesis numbered by 0 to M–1 (M is a positive integer), denoted by reference numerals 321 to 324. The image-data-for-synthesis G2G of M frames are stored here. The data of each frame of the image-data-for-synthesis G2G do not need to be of the full size of one frame. Just the image data corresponding to the size of "the horizontal size 3113 of image-for-synthesis" multiplied by "the vertical size 3114 of image-for-synthesis" should be provided as described above. A composite image provided by "the horizontal size 3113 of image-for-synthesis" and "the vertical size 3114 of image-for-synthesis", which are control parameters related to the size of the composite image, and "the horizontal position 3111 of image-for-synthesis" and "the vertical position 3112 of image-for-synthesis", which are control parameters related to the position of the composite image becomes like one denoted by the reference numeral 92 shown in FIG. 7.

Figure 9:
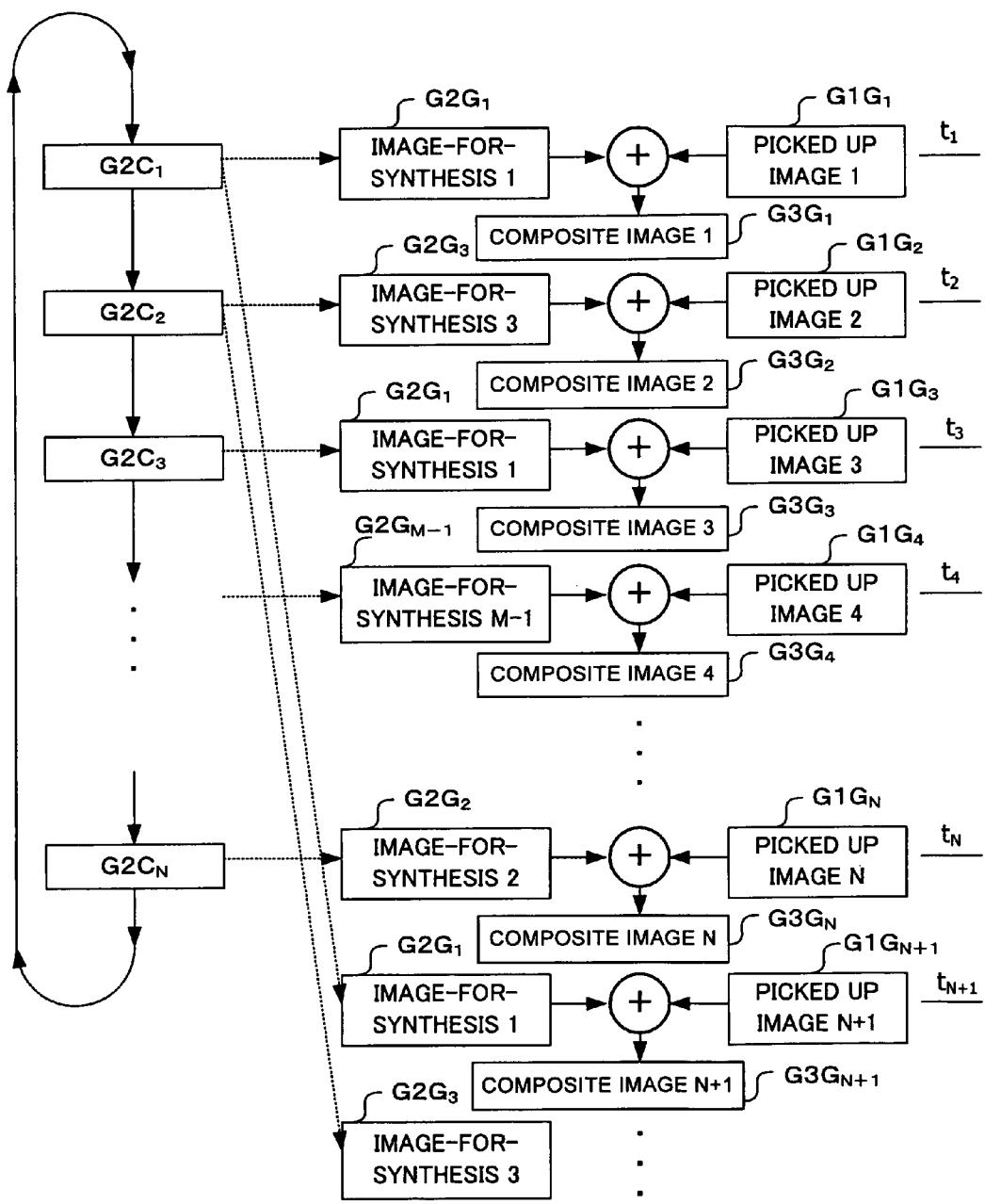
FIG. 9 is a diagram showing an example of a relationship between the control-data-for-synthesis and the image-data-for-synthesis.
Figure 10:
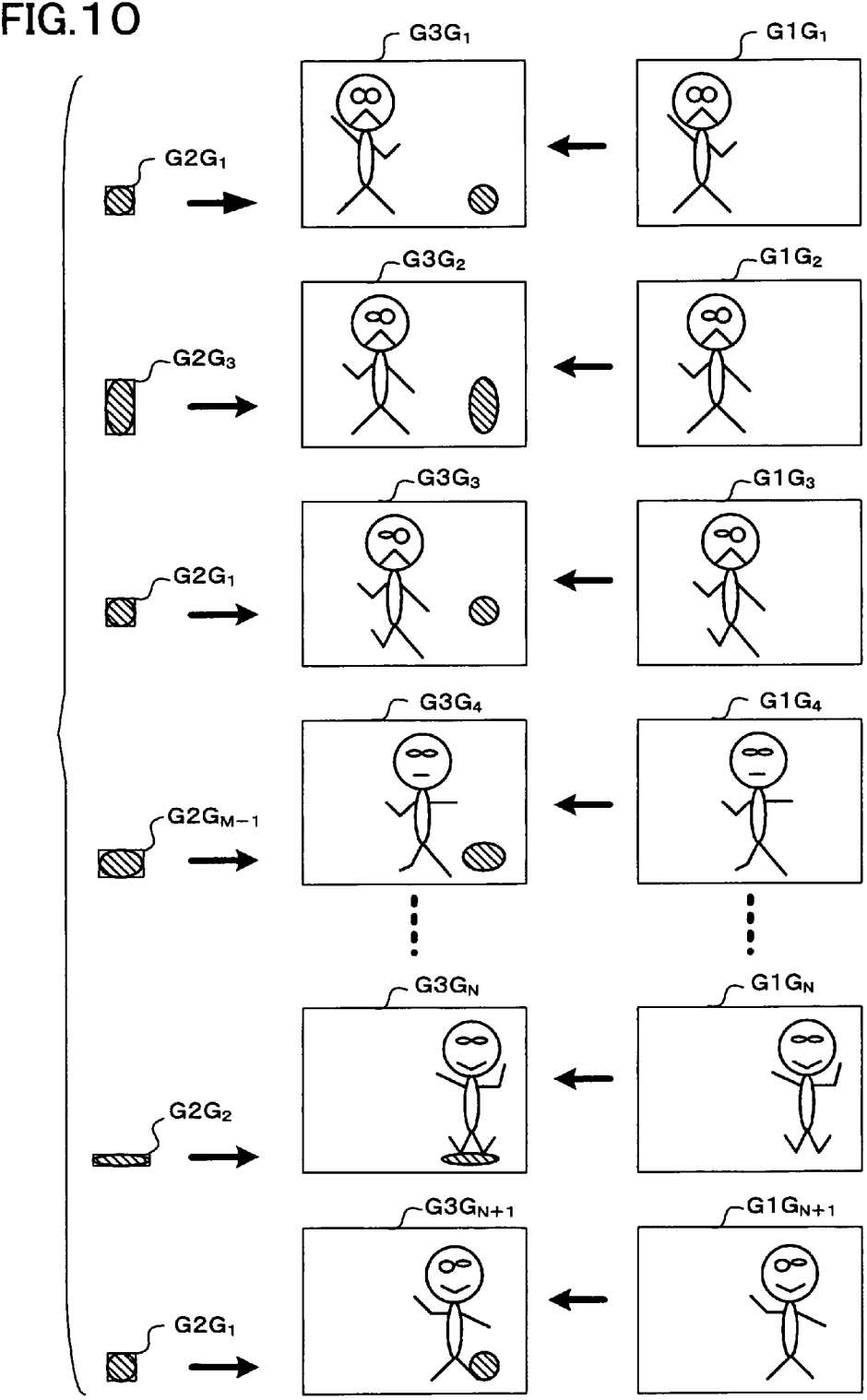
FIG. 10 is a diagram showing an example of display of the composite images in FIG. 9.
Figure 11:
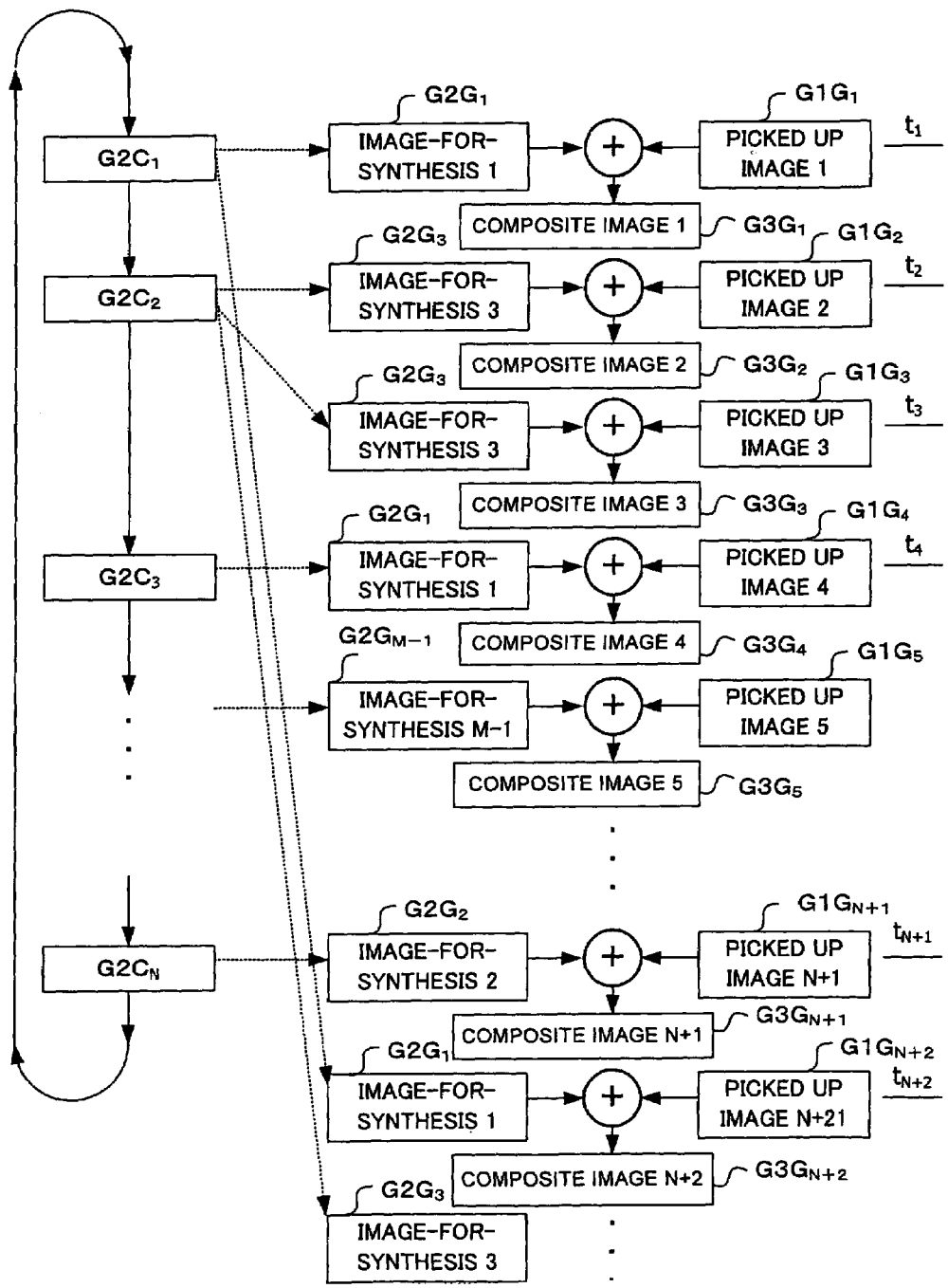
FIG. 11 is a diagram showing another example of a relationship between the control-data-for-synthesis and the image-data-for-synthesis.
Figure 12:
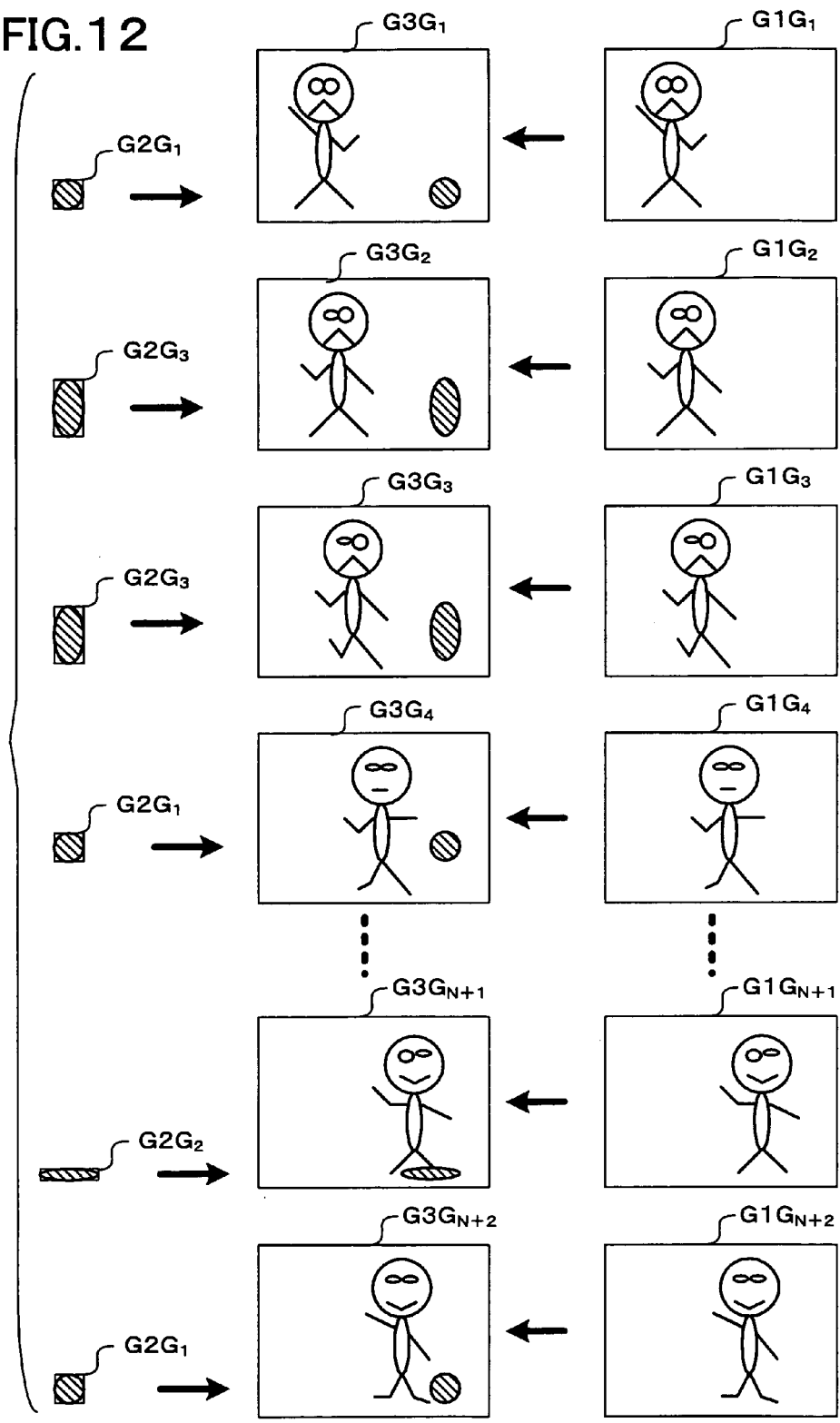
FIG. 12 is a diagram showing an example of display of the composite images in FIG. 11.

FIG. 9 is a diagram showing an example of a relationship between the control-data-for-synthesis G2C and the image-data-for-synthesis G2G, and FIG. 10 is a diagram showing an example of display of the composite images formed in FIG. 9. Further, FIG. 11 is a diagram showing another example of a relationship between the control-data-for-synthesis G2C and the image-data-for-synthesis G2G, and FIG. 12 is a diagram showing an example of display of the composite images formed in FIG. 11.

FIG. 9 and FIG. 10 show a case where "the repetition count 3117 of current image-for-synthesis" of each header is zero (that is, a case of displaying the image-data-for-synthesis item G2G in one frame and displaying the next image-data-for-synthesis item G2G in the next frame). FIG. 11 and FIG. 12 show a case where "the repetition count 3117 of current image-for-synthesis" of the second header $G2C_2$ from the top is one (that is, a case of displaying an image-data-for-synthesis G2G in two consecutive frames).

The example shown in FIG. 9 and FIG. 10 will now be described. The sequence of this example is specified as follows:

The header $G2C_1$ is read from the control-data-for-synthesis storage 31, and consequently, the image-data-for-synthesis $G2G_1$ is read from the image-data-for-synthesis storage 32;

The header $G2C_2$ is read from the control-data-for-synthesis storage 31, and consequently, the image-data-for-synthesis $G2G_3$ is read from the image-data-for-synthesis storage 32;

The header $G2C_3$ is read from the control-data-for-synthesis storage 31, and consequently, the image-data-for-synthesis $G2G_1$ is read from the image-data-for-synthesis storage 32;

The similar processing is repeated; and

The header $G2C_N$ is read from the control-data-for-synthesis storage 31, and consequently, the image-data-for-synthesis $G2G_2$ is read from the image-data-for-synthesis storage 32. This example is the case where "the repetition count 3117 of current image-for-synthesis" of each header is zero.

In FIG. 9, when $t=t_1$, the header $G2C_1$ is read from the control-data-for-synthesis storage 31 before the moving-image data $G1G_1$ is input from the image pickup device 1. In accordance with the contents of the header $G2C_1$, the image-data-for-synthesis $G2G_1$ is read from the image-data-for-synthesis storage 32 at a timing based on the input timing of the moving-image data $G1G_1$, and the image synthesis section 5 produces the composite image $G3G_1$ and outputs the composite image $G3G_1$ to the videophone processor 10. To be more precise, switching for each pixel is carried out in accordance with a control signal to the selector 54 in the image synthesis section 5 so that the moving-image data $G1G_1$, the image-data-for-synthesis $G2G_1$, or the composite image $G3G_1$ formed from the moving-image data $G1G_1$ and the image-data-for-synthesis $G2G_1$ is selectively output to the videophone processor 10.

When $t=t_2$, the header $G2C_2$ is read from the control-data-for-synthesis storage 31 before the moving-image data $G1G_2$ is input from the image pickup device 1. The reason why the header $G2C_2$ is read is because "the pointer information 3116 pointing at the next control-data-for-synthesis (header)" in the header $G2C_1$ points at the header $G2C_2$. Accordingly, there is no need to read the headers G2C in the order in which the headers G2C were stored in the control-data-for-synthesis storage 31. Further, there is no need to store the headers G2C in the order of the sequence. The image-data-for-synthesis $G2G_3$ is read from the image-data-for-synthesis storage 32 at a timing based on the input timing of the moving-image data $G1G_2$, in accordance with the contents of the header $G2C_2$, and then the image synthesis section 5 produces the composite image $G3G_2$ and outputs the composite image $G3G_2$ to the videophone processor 10.

When $t=t_3$, the header $G2C_3$ is read from the control-data-for-synthesis storage 31 before the moving-image data $G1G_3$ is input from the image pickup device 1. The reason why the header $G2C_3$ is read is because "the pointer information 3116 pointing at the next control-data-for-synthesis (header)" in the header $G2C_2$ points at the header $G2C_3$. In accordance with the contents of the header $G2C_3$, the image-data-for-synthesis $G2G_1$ is read from the image-data-for-synthesis storage 32, at a timing based on the input timing of the moving-image data $G1G_3$, and then the image synthesis section 5 produces the composite image $G3G_3$ and outputs the composite image $G3G_3$ to the videophone processor 10. The header $G2C_3$ references the image-data-for-synthesis $G2G_1$, as in the case of the header $G2C_1$. If "the horizontal size 3113 of image-for-synthesis" and "the vertical size 3114 of image-for-synthesis" are the same, the same image-data-for-synthesis G2G may be referenced.

When $t=t_N$, the header $G2C_N$ is read from the control-data-for-synthesis storage 31 before the moving-image data $G1G_N$ is input from the image pickup device 1. The reason why the header $G2C_N$ is read is because "the pointer information 3116 pointing at the next control-data-for-synthesis (header)" in the previous header G2C points at the header $G2C_N$. The previous header G2C is not necessarily the (N−1)-th header G2C stored in the control-data-for-synthesis storage 31. The image-data-for-synthesis $G2G_2$ is read from the image-data-for-synthesis storage 32 in accordance with the contents of the header $G2C_N$ at a timing based on the input timing of the moving-image data $G1G_N$, and the image synthesis section 5 produces the composite image $G3G_N$ and outputs the composite image $G3G_N$ to the videophone processor 10.

When $t=t_{N+1}$, the header $G2C_1$ is read from the control-data-for-synthesis storage 31 before the moving-image data $G1G_{N+1}$ is input from the image pickup device 1. The reason why the header $G2C_1$ is read is because "the pointer information 3116 pointing at the next control-data-for-synthesis (header)" in the header $G2C_N$ points at the header $G2C_1$. Even if the control-data-for-synthesis storage 31 stores N headers G2C, all the N headers do not have to be used. If "the pointer information 3116 pointing at the next control-data-for-synthesis (header)" of the (N−1)-th header G2C is set to point at the header $G2C_1$, the N-th header G2C will never be read. The image-data-for-synthesis $G2G_1$ is read from the image-data-for-synthesis storage 32 at a timing based on the input timing of the moving-image data $G1G_{N+1}$, in accordance with the contents of the header $G2C_1$, and the image synthesis section 5 produces the composite image $G3G_{N+1}$ and outputs the composite image $G3G_{N+1}$ to the videophone processor 10.

In accordance with the sequence formed by the headers from $G2C_1$ to $G2C_N$, the image-data-for-synthesis G2G input to the image synthesis section 5 are further updated, and the composite image data G3G are produced from the moving-image data G1G and the image-data-for-synthesis G2G.

Next, an example shown in FIG. 11 and FIG. 12 will be described. The sequence of this example is specified as follows:

The header $G2C_1$ is read from the control-data-for-synthesis storage 31, and consequently, the image-data-for-synthesis $G2G_1$ is read from the image-data-for-synthesis storage 32;

The header $G2C_2$ is read from the control-data-for-synthesis storage 31, and consequently, the image-data-for-synthesis $G2G_3$ is read from the image-data-for-synthesis storage 32;

The header $G2C_3$ is read from the control-data-for-synthesis storage 31, and consequently, the image-data-for-synthesis $G2G_1$ is read from the image-data-for-synthesis storage 32;

The similar processing is repeated; and

The header $G2C_N$ is read from the control-data-for-synthesis storage 31, and consequently, the image-data-for-synthesis $G2G_2$ is read from the image-data-for-synthesis storage 32. In this example, "the repetition count 3117 of current image-for-synthesis" of the header $G2C_2$ is one.

When $t=t_1$, the header $G2C_1$ is read from the control-data-for-synthesis storage 31 before the moving-image data $G1G_1$ is input from the image pickup device 1. In accordance with the contents of the header $G2C_1$, the image-data-for-synthesis $G2G_1$ is read from the image-data-for-synthesis storage 32 at a timing based on the input timing of the moving-image data $G1G_1$, and the image synthesis section 5 produces the composite image $G3G_1$ and outputs the composite image $G3G_1$ to the videophone processor 10. To be more precise, switching for each pixel is carried out by a control signal to the selector 54 in the synthesis section 5, and the moving-image data $G1G_1$, the image-data-for-synthesis $G2G_1$, or the composite image $G3G_1$ of the moving-image data $G1G_1$ and the image-data-for-synthesis $G2G_1$ is selectively output to the videophone processor 10.

When $t=t_2$, the header $G2C_2$ is read from the control-data-for-synthesis storage 31 before the moving-image data $G1G_2$ is input from the image pickup device 1. The reason why the header $G2C_2$ is read is just because "the pointer information 3116 pointing at the next control-data-for-synthesis (header)" in the header $G2C_1$ points at the header $G2C_2$. Accordingly, there is no need to read the headers G2C in the order in which the headers were stored in the control-data-for-synthesis storage 31. Further, there is no need to store the headers G2C in the order of the sequence. In accordance with the contents of the header $G2C_2$, the image-data-for-synthesis $G2G_3$ is read from the image-data-for-synthesis storage 32 at a timing based on the input timing of the moving-image data $G1G_2$, and the image synthesis section 5 produces the composite image $G3G_2$ and outputs the composite image $G3G_2$ to the videophone processor 10.

When $t=t_3$, the header $G2C_2$ is read from the control-data-for-synthesis storage 31 before the moving-image data $G1G_3$ is input from the image pickup device 1. The reason why the header $G2C_2$ is read is because "the repetition count 3117 of current image-for-synthesis" in the header $G2C_2$ read when $t=t_2$ is set to one. In another configuration, if "the repetition count 3117 of current image-for-synthesis" in the header $G2C_2$ read when $t=t_2$ is set to one, the header G2C is not read from the control-data-for-synthesis storage 31 at the next timing (when $t=t_3$), and the contents of the header G2C when $t=t_2$ may be continued to be held. In accordance with the contents of the header $G2C_2$, the image-data-for-synthesis $G2G_3$ is read from the image-data-for-synthesis storage 32 at a timing based on the input timing of the moving-image data $G1G_3$, and the image synthesis section 5 produces and outputs the composite image $G3G_3$ to the videophone processor 10.

When $t=t_4$, the header $G2C_3$ is read from the control-data-for-synthesis storage 31 before the moving-image data $G1G_4$ is input from the image pickup device 1. The reason why the header $G2C_3$ is read is because "the pointer information 3116 pointing at the next control-data-for-synthesis (header)" in the header $G2C_2$ points at the header $G2C_3$. In accordance with the contents of the header $G2C_3$, the image-data-for-synthesis $G2G_1$ is read from the image-data-for-synthesis storage 32 at a timing based on the input timing of the moving-image data $G1G_4$, and the image synthesis section 5 produces the composite image $G3G_4$ and outputs the composite image $G3G_4$ to the videophone processor 10. The header $G2C_3$ references the image-data-for-synthesis $G2G_1$ as in the case of the header $G2C_1$. If "the horizontal size 3113 of image-for-synthesis" and "the vertical size 3114 of image-for-synthesis" are the same, the same image-data-for-synthesis G2G may be referenced.

When $t=t_{N+1}$, the header $G2C_N$ is read from the control-data-for-synthesis storage 31 before the moving-image data $G1G_{N+1}$ is input from the image pickup device 1. The reason why the header $G2C_N$ is read is because "the pointer information 3116 pointing at the next control-data-for-synthesis (header)" in the previous header G2C points at the header $G2C_N$. There is no need of the previous header G2C being the (N−1)-th header G2C stored in the control-data-for-synthesis storage 31. In accordance with the contents of the header $G2C_N$, the image-data-for-synthesis $G2G_2$ is read from the image-data-for-synthesis storage 32 at a timing based on the input timing of the moving-image data $G1G_{N+1}$, and the image synthesis section 5 produces the composite image $G3G_{N+1}$ and outputs the composite image $G3G_{N+1}$ to the videophone processor 10.

When $t=t_{N+2}$, the header $G2C_1$ is read from the control-data-for-synthesis storage 31 before the moving-image data $G1G_{N+2}$ is input from the image pickup device 1. The reason why the header $G2C_1$ is read is because "the pointer information 3116 pointing at the next control-data-for-synthesis (header)" in the header $G2C_N$ points at the header $G2C_1$. There is no need to use all of the N headers G2C even if the N headers are stored in the control-data-for-synthesis storage 31. If "the pointer information 3116 pointing at the next control-data-for-synthesis (header)" of the (N−1)-th header G2C points at the header $G2C_1$, the N-th header G2C will not be read. In accordance with the contents of the header $G2C_1$, the image-data-for-synthesis $G2G_1$ is read from the image-data-for-synthesis storage 32 at a timing based on the input timing of the moving-image data $G1G_{N+2}$, and the image synthesis section 5 produces the composite image $G3G_{N+2}$ and outputs the composite image $G3G_{N+2}$ to the videophone processor 10.

The number of headers G2C stored in the control-data-for-synthesis storage 31 and the number of items of image-data-for-synthesis G2G stored in the image-data-for-synthesis storage 32 (the number of frames) will now be described.

The number of headers G2C and the number of items of image-data-for-synthesis G2G are not subject to important constraints. However, from the point of view of the memory size, it is practically valuable that the number of the headers G2C is not less than the number of items of the image-data-for-synthesis G2G. In that case, by specifying the same image-data-for-synthesis G2G for a still (or slow-moving) frame (scene), the memory size can be reduced and a long sequence can be specified. If the same image-data-for-synthesis G2G can be specified for an A frame and a B frame (the tenth frame and the twentieth frame, for example) in the same sequence (if the tenth frame and the twentieth frame can use the same image-data-for-synthesis), the memory size can be reduced further and a further long sequence can be specified. Of course, all the stored headers G2C and items of image-data-for-synthesis G2G need not be used. A necessary header G2C and a necessary image-data-for-synthesis G2G can be used in a desired order to form a sequence.

Further, "the repetition count 3117 of current image-for-synthesis" can be separately specified for each frame. This is effective when the speed of motion should be varied in a sequence by using a small number of items of the image-data-for-synthesis G2G. This can also reduce the memory size.

Because the image synthesis section 5 forms a composite image by reading the image-data-for-synthesis G2G from the image-data-for-synthesis storage 32 in synchronization with the input of the moving-image data G1G from the image pickup device 1, the composite image can be produced without interruption within a frame.

If the frame rate of the moving-image data G1G input from the image pickup device 1 is high (if a large number of frames are input in one second), time-varying of the image-data-for-synthesis G2G can be appropriately adjusted by setting "the repetition count 3117 of current image-for-synthesis" (setting the repetition count to high, for example).

As has been described above, the moving-image synthesis device 100 of the first embodiment can automatically synthesize the image-data-for-synthesis G2G forming a frame of a moving-image and the moving-image data G1G in synchronization with the moving-image data G1G from the image pickup device 1 by setting a synthesis sequence in the control-data-for-synthesis storage 31 in the data-for-synthesis storage 3, so that a moving composite image can be formed without putting a load on the CPU such as when the CPU executes software.

Further, the images are synthesized in synchronization with frames, so that the frames will not be output midway through synthesis processing. Therefore, good composite moving-images can be obtained.

Furthermore, by causing the headers G2C and the image-data-for-synthesis G2G forming a sequence to be related with each other, and a plurality of sequences can share the image-data-for-synthesis G2G, so that the amount of image-data-for-synthesis G2G to be provided can be suppressed.

Moreover, a repetition count can be specified separately for each frame, so that a moving-image overlay with varying speed can be carried out.

In addition, an image formed by overlaying an animated overlay image on a taken image can be sent through a videophone channel, and many other applications can be found in information terminal apparatuses, especially in cellular phones and the like.

Further, the moving-image synthesis device 100 of the first embodiment holds the size of the image-data-for-synthesis G2G and the image synthesis position of the image-data-for-synthesis G2G corresponding to the moving-image data G1G output from the image pickup device 1 and other moving-image input stage as the data of the header G2C, so that the image-data-for-synthesis G2G and the moving-image data output from the moving-image input stage can be synthesized in a given position and in a given size.

Furthermore, the moving-image synthesis device 100 of the first embodiment holds a pointer pointing at the address where the image-data-for-synthesis G2G of the current frame is stored and a pointer pointing at the data of the header G2C of the next frame, as the data of the header G2C, so that the items of image-data-for-synthesis G2G and the headers G2C can be stored in given addresses and in given orders, in the data-for-synthesis storage.

Moreover, the moving-image synthesis device 100 of the first embodiment holds the repetition count of the image-data-for-synthesis G2G of the current frame as the data of the header G2C, so that the sequence formed with the image-data-for-synthesis G2G can be specified to an optimum speed if the moving-image data G1G is input from the moving-image input stage at a high frame rate.

In addition, the moving-image synthesis device 100 of the first embodiment can set the number of frames of the image-data-for-synthesis G2G to be stored in the data-for-synthesis storage to the same number as or a lower number than the number of frames of the data of the header G2C, so that a long sequence of moving-image can be synthesized with a small amount of image-data-for-synthesis G2G, and the memory can be efficiently used in relation to the length of the sequence.

SECOND EMBODIMENT

Figure 13:
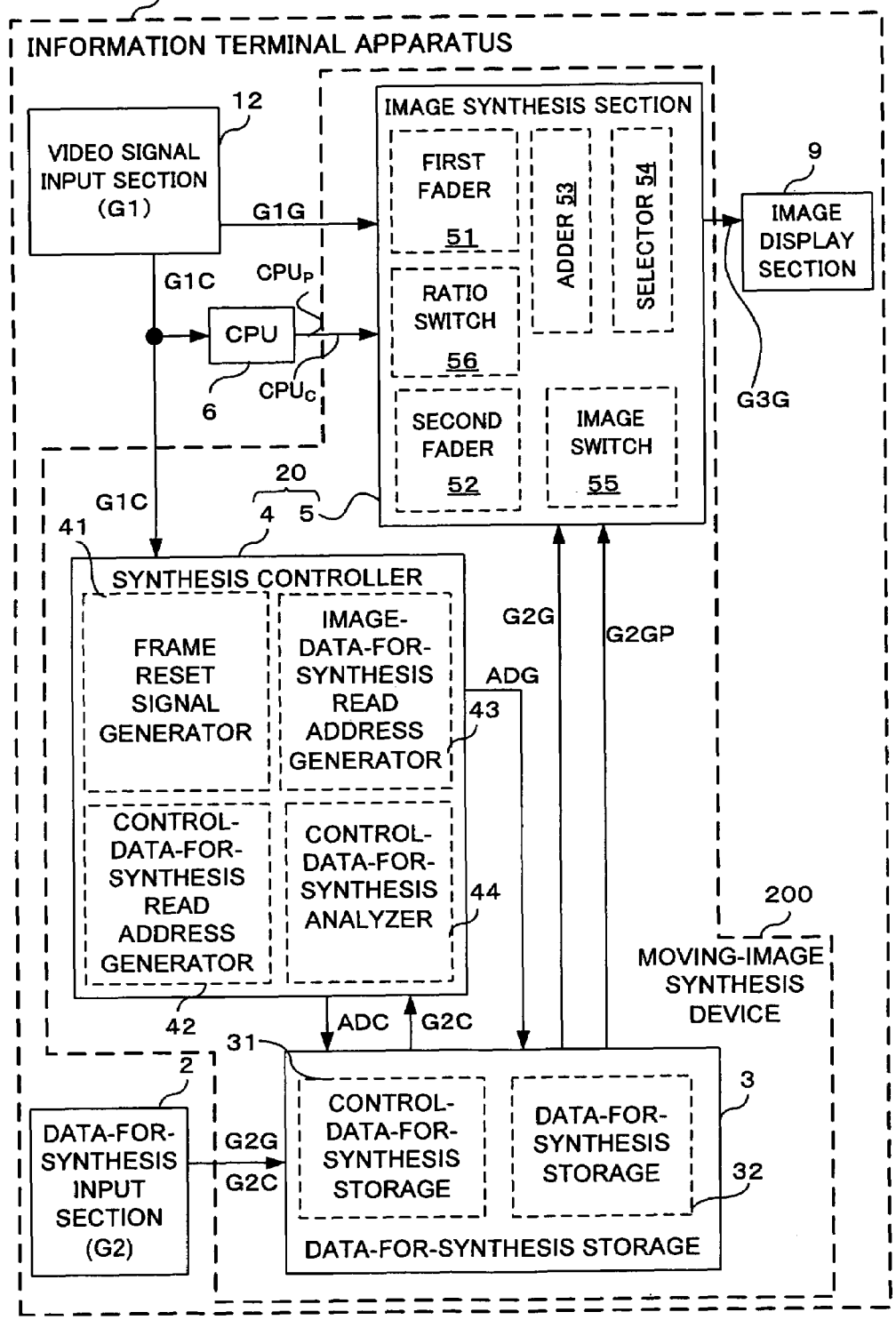
FIG. 13 is a block diagram showing a configuration of a moving-image synthesis device and an information terminal apparatus with a moving-image synthesis function, of a second embodiment of the present invention.

FIG. 13 is a block diagram showing a configuration of a moving-image synthesis device 200 (a device which can implement the moving-image synthesis method of the present invention) and an information terminal apparatus 210 with a moving-image synthesis function, including the moving-image synthesis device 200, of a second embodiment of the present invention. Those structures of the second embodiment in FIG. 13 that are identical to or correspond to structures of the first embodiment are assigned identical symbols.

The information terminal apparatus 210 of the second embodiment shown in FIG. 13 is a composite moving-image display apparatus which can synthesize an image-for-synthesis and an input video signal in real time and can display a composite moving-image.

The information terminal apparatus 210 of the second embodiment shown in FIG. 13 differs from the apparatus of the first embodiment shown in FIG. 1 in the following points: the image pickup device 1 is replaced by a video signal input section 12; the voice input section 7, the voice output section 8, and the videophone processor 10 are eliminated; and the image display section 9 is connected directly to the image synthesis section 5.

The video signal input section 12 is connected to a video input terminal (not shown) or is connected directly to a CPU bus (not shown) or the like, and receives the input of a digital video signal and a decode signal of MPEG4 or the like (collectively referred to as a digital video signal).

In the second embodiment, a digital video signal input to the video signal input section 12 is separated into moving-image data G1G and a moving-image control signal G1C. The moving-image data G1G is input to the image synthesis section 5, and the moving-image control signal G1C is input to the synthesis controller 4 and the CPU 6. The image synthesis section 5 and the synthesis controller 4 perform the same processing as in the first embodiment, and form the composite moving-image data G3G by synthesizing the moving-image data G1G and the image-data-for-synthesis G2G.

The moving-image synthesis device 200 or the information terminal apparatus 210 having a moving-image synthesis function of the second embodiment can automatically synthesize the image-data-for-synthesis G2G forming a frame of a moving-image and the moving-image data G1G, which is a digital video signal from the video signal input section 12, in synchronization with the moving-image data G1G by setting a synthesis sequence in the control-data-for-synthesis storage 31 in the data-for-synthesis storage 3, so that a moving composite image can be formed without putting a load on the CPU such as when the CPU executes software.

Further, the images are synthesized in synchronization with frames, so that the frames will not be output midway through synthesis processing. Therefore, good composite moving-images can be obtained.

Furthermore, by causing the headers G2C and the image-data-for-synthesis G2G forming a sequence to be related with each other, and a plurality of sequences can share the image-data-for-synthesis G2G, so that the amount of image-data-for-synthesis G2G to be provided can be suppressed.

Moreover, a repetition count can be specified separately for each frame, so that a moving-image overlay with varying speed can be carried out.

Except for the above described respects, the second embodiment is the same as the first embodiment.

THIRD EMBODIMENT

Figure 14:
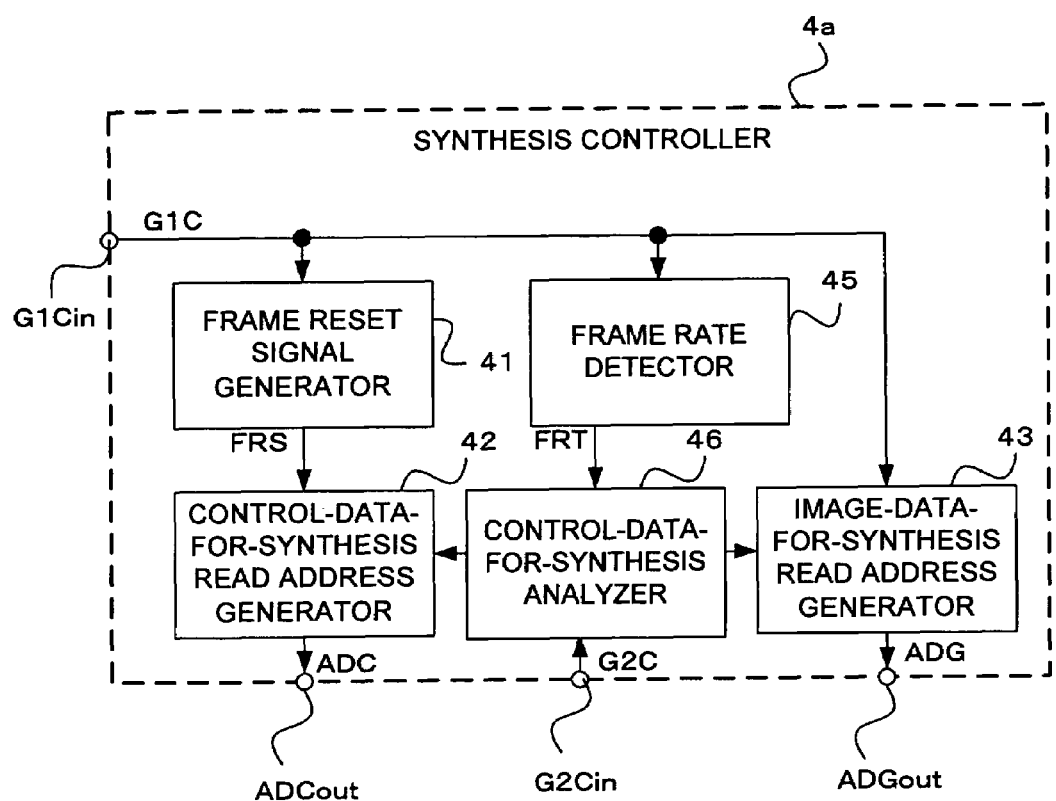
FIG. 14 is a block diagram showing a configuration of a synthesis controller in a moving-image synthesis device of a third embodiment of the present invention.

FIG. 14 is a block diagram of a synthesis controller 4a in a moving-image synthesis device (a device which can implement the moving-image synthesis method of the present invention) of a third embodiment of the present invention.

The moving-image synthesis device of the third embodiment differs from the moving-image synthesis device of the first embodiment shown in FIG. 1 in that the synthesis controller 4 of the first embodiment is replaced by the synthesis controller 4a shown in FIG. 14.

The synthesis controller 4a of the third embodiment shown in FIG. 14 differs from the synthesis controller 4 of the first embodiment shown in FIG. 3 in that the synthesis controller 4a has a frame rate detector 45, and the control-data-for-synthesis analyzer 44 of the first embodiment is replaced by the control-data-for-synthesis analyzer 46 of the third embodiment. The control-data-for-synthesis analyzer 46 receives a frame rate FRT output from the frame rate detector 45 and controls the control-data-for-synthesis read address generator 42 and the image-data-for-synthesis read address generator 43.

The control-data-for-synthesis analyzer 46 controls "the repetition count 3117 of current image-for-synthesis" included in the information of the header G2C read from the control-data-for-synthesis storage 31 in the data-for-synthesis storage 3, through the input terminal $G2C_{in}$, of the synthesis controller 4a.

Suppose that the frame rate of the moving-image data G1G output from the image pickup device 1 is N*M (N and M are positive integers), as calculated by the frame rate detector 45. For example, suppose that N is 5, M is 3, and the frame rate is 15 fps (frames per second). Here, "the repetition count 3117 of current image-for-synthesis", which is included in the parameters of the header G2C stored in the control-data-for-synthesis storage 31 within the data-for-synthesis storage 3, is set to M (=3) beforehand. This value is prepared so that the motion (frame rate) of the composite moving-image is optimized (becomes effective) at a frame rate of N*M. Here, the optimum and effective motion of the composite image is at 5 fps.

Then, suppose that the operating environment changes. For example, suppose that the ambient light becomes low and the frame rate of the moving-image data G1G output from the image pickup device 1 is multiplied by L/M (L is a positive integer) to be set to N*L. When L=1, for example, the frame rate after the change is 5 fps. The frame rate detector 45 provides a calculation result of N*L and outputs the information to the control-data-for-synthesis analyzer 46. When receiving the information of a frame rate of N*L, the control-data-for-synthesis analyzer 46 actually multiplies the repetition count by L/M and changes the repetition count to L.

Because L=1, the repetition count is 1 here. The actual rate of the image-data-for-synthesis G2G is 5 fps, and the rate of the original image is kept at the optimum level (effective level). In other words, "the repetition count 3117 of current image-for-synthesis" included in the header G2C is set in correspondence with the reference frame rate (N*M in the example given above). If the frame rate of the moving-image data G1G changes, the control-data-for-synthesis analyzer 46 automatically calculates in accordance with the frame rate information from the frame rate detector 45, and the control data read address generator 43 and the image-data-for-synthesis read address generator 43 are controlled accordingly.

As has been described above, the moving-image synthesis device of the third embodiment has the frame rate detector 45 in the synthesis controller 4a and automatically changes the actual composite moving-image repetition count in accordance with the calculated frame rate, so that the optimum and effective motion of the original image can be maintained, and consequently, an optimum and efficient composite moving-image can be obtained.

Further, the third embodiment has been described above, supposing that the frame rate of the moving-image data G1G output from the taken image 1 changes automatically. The frame rate can be changed intentionally as controlled by the CPU or the like. In that case, the frame rate need not be calculated by the frame rate detector 45. Accordingly, the same effect can be obtained by providing a current frame rate setting device instead of the frame rate detector 45.

Furthermore, the frame rate detector 45 of the third embodiment detects the frame rate of the moving-image data output from the image pickup device 1 or another moving-image input stage. Because the synthesis controller 4 controls the reading of the image-data-for-synthesis G2G from the data-for-synthesis storage 3 in accordance with the frame rate detected by the frame rate detector 45, the motion of the image-data-for-synthesis G2G stored in the data-for-synthesis storage 3 can be kept in the optimum and effective state even if the frame rate of the moving-image data changes.

To be more specific, the synthesis controller 4a of the third embodiment controls the reading of the image-data-for-synthesis G2G to the data-for-synthesis storage 3 in such a manner that the repetition count of the image-data-for-synthesis G2G becomes M when the frame rate of the moving-image data output from the image pickup device 1 or another moving-image input stage is N*M, and the repetition count of the image-data-for-synthesis G2G from the data-for-synthesis storage 3 becomes L when the frame rate becomes N*L. According to the third embodiment, the motion of the image-data-for-synthesis G2G stored in the data-for-synthesis storage 3 is kept in the optimum and effective state, or the state of frame rate N, even if the frame rate of the moving-image data changes.

Except for the above described respects, the third embodiment is the same as the first embodiment. Further, the synthesis controller 4a of the embodiment can be applied to the moving-image synthesis device of the second embodiment.

MODIFICATIONS OF THE PRESENT INVENTION

The structure and the parameters of the control-data-for-synthesis (header) G2C of the embodiments of the present invention are not limited to those shown in FIG. 6. The similar effect can be obtained even when the control-data-for-synthesis (header) G2C has "a horizontal starting position of composite image", "a vertical starting position of composite image", "a horizontal ending position of composite image", and "a vertical ending position of composite image", instead of "the horizontal position 3111 of image-for-synthesis", "the vertical position 3112 of image-for-synthesis", "the horizontal size 3113 of image-for-synthesis", and "the vertical size 3114 of image-for-synthesis", or when the order of the parameters is changed as desired.

Further, in the embodiments described above, there is no need to store the headers G2C continuously in the control-data-for-synthesis storage 31 as shown in the figure or to store the items of image-data-for-synthesis G2G continuously in the image-data-for-synthesis storage 32.

Furthermore, in the first embodiment and the third embodiment, the control-data-for-synthesis storage 31 and the image-data-for-synthesis storage 32 are separately provided in the data-for-synthesis storage 3. However, the control-data-for-synthesis (header) G2C and the image-data-for-synthesis G2G may be stored in a united state or in a mixed state.

Moreover, in the embodiments described above, when a sequence is formed, there is no need to match the order of the items of control-data-for-synthesis (header) G2C stored in the control-data-for-synthesis storage 31 with the order of the items of control-data-for-synthesis (header) G2C forming the sequence. Similarly, the items of image-data-for-synthesis G2G stored in the image-data-for-synthesis storage 32 may be stored in any order.

The invention claimed is:

1. A moving-image synthesis device comprising:
   a synthesis processor which receives a video signal, which includes moving-image data and a moving-image control signal including display timing information of each frame of the moving-image data and the synthesis processor processes data-for-synthesis recursively; and
   a storage which stores data-for-synthesis, which includes a plurality of items of image-data-for-synthesis and a plurality of items of control-data-for-synthesis associated with the plurality of items of the image-data-for-synthesis:
   wherein the synthesis processor performs the steps of:
      reading at least one of the plurality of items of the control-data-for-synthesis from the storage at a timing based on the moving-image control signal when the control-data-for-synthesis includes a repetition count indicating that the control-data-for-synthesis is not repeated and when the control-data-for-synthesis includes a repetition count indicating that the control-data-for-synthesis is repeated, the synthesis processor will use the control-data-for-synthesis that was previously read for a number of successive repetitions of processing data-for-synthesis equal to the repetition count of the control-data-for-synthesis;
      analyzing the control-data-for-synthesis which includes pointer information pointing to the next control-data-for-synthesis that is to be read, pointer information pointing to the image-data-for-synthesis that is to be read and the repetition count of current image-data-for-synthesis indicating the number of frames the current image-for-synthesis is displayed;
      reading the image-data-for-synthesis from the storage in accordance with the read control-data-for-synthesis at a timing in accordance with the input timing of the moving-image data when the control-data-for-synthesis includes a repetition count indicating that the image-data-for-synthesis is not repeated and when the control-data-for-synthesis includes a repetition count indicating that the image-data-for-synthesis is repeated, the image-data-for-synthesis will use the image-data-for-synthesis that was previously read for a number of successive repetitions of processing data-for-synthesis equal to the repetition count of the control-data-for-synthesis;
      executing processing to synthesize one frame of the moving-image data and the read image-data-for-synthesis forming a composite image.

2. The moving-image synthesis device according to claim 1, wherein
   each of the items of the control-data-for-synthesis stored in the storage includes display position information and display size information of the image-data-for-synthesis associated with the control-data-for-synthesis; and the synthesis processor overlays an image-for-synthesis of a size based on the display size information in a position based on the display position information.

3. The moving-image synthesis device according to claim 1, wherein the moving-image control signal includes information of a frame rate of the moving-image data; and the synthesis processor controls the reading of the control-data-for-synthesis from the storage in accordance with the frame rate.

4. The moving-image synthesis device according to claim 1, wherein the moving-image control signal includes information of a frame rate of the moving-image data where the frame rate of the moving-image data is N*M, where N and M are respectively positive integers, N is the effective motion of the composite image and M is the repetition count of the current image for synthesis which is included in the control-data-for-synthesis; and when the frame rate is multiplied by L/M, where L is a positive integer, the frame rate is effectively N*L, the repetition count effectively used for reading at least one of the plurality of items of the stored control-data-for-synthesis at a timing based on the moving-image control signal is L.

5. The moving-image synthesis device according to claim 1, wherein the processing by the synthesis processor to synthesize one frame of the moving-image data and the read image-data-for-synthesis forming a composite image further includes:

processing to attenuate amplitude levels of the moving-image data and the image-data-for-synthesis and add the attenuated amplitude levels of the moving-image data and the image-data-for-synthesis.

6. The moving-image synthesis device according to claim 5, wherein the synthesis processor has a function to adjust an attenuation rate of the amplitude level of the moving-image data and an attenuation rate of the amplitude level of the image-data-for-synthesis.

7. The moving-image synthesis device according to claim 5, wherein the synthesis processor selectively outputs any of the moving-image data, the image-data-for-synthesis, and the image data obtained from the processing of adding.

8. A moving-image synthesis method comprising the steps of:

storing data-for-synthesis, which includes a plurality of items of image-data-for-synthesis and a plurality of items of control-data-for-synthesis associated with the plurality of items of the image-data-for-synthesis;

receiving a video signal, which includes moving-image data and a moving-image control signal including display timing information of each frame of the moving-image data; and processing data-for-synthesis recursively which further comprises:

reading at least one of the plurality of items of the stored control-data-for- synthesis at a timing based on the moving-image control signal when the control-data-for-synthesis includes a repetition count indicating that the control-data-for-synthesis is not repeated and when the control-data-for-synthesis includes a repetition count indicating that the control-data-for-synthesis is repeated, a synthesis processor will use the control-data-for-synthesis that was previously read for a number of successive repetitions of processing data-for-synthesis equal to the repetition count of the control-data-for-synthesis;

analyzing the control-data-for-synthesis which includes pointer information pointing to the next control-data-for-synthesis that is to be read, pointer information pointing to the image-data-for-synthesis that is to be read and the repetition count of current image-data-for-synthesis indicating the number of frames the current image-for-synthesis is displayed;

reading the image-data-for-synthesis from the storage in accordance with the read control-data-for-synthesis at a timing in accordance with the input timing of the moving-image data when the control-data-for-synthesis includes a repetition count indicating that the image-data-for-synthesis is not repeated and when the control-data-for-synthesis includes a repetition count indicating that the image-data-for-synthesis is repeated, the image-data-for-synthesis will use the image-data-for-synthesis that was previously read for a number of successive repetitions of processing data-for-synthesis equal to the repetition count of the control-data-for-synthesis; and executing processing to synthesize one frame of the moving-image data and the read image-data-for-synthesis forming a composite image.

9. The moving-image synthesis method according to claim 8, wherein the moving-image control signal includes information of a frame rate of the moving-image data; and the reading of the stored control-data-for-synthesis is controlled in accordance with the frame rate.

10. The moving-image synthesis method according to claim 8, wherein the moving-image control signal includes information of a frame rate of the moving-image data where the frame rate of the moving-image data is N*M, where N and M are respectively positive integers, N is the effective motion of the composite image and M is the repetition count of the current image for synthesis which is included in the control-data-for-synthesis; and when the frame rate is multiplied by L/M, where L is a positive integer, the frame rate is effectively N*L, the repetition count effectively used for reading at least one of the plurality of items of the stored control-data-for-synthesis at a timing based on the moving-image control signal is L.

11. The moving-image synthesis method according to claim 8, wherein executing processing to synthesize one frame of the moving-image data and the read image-data-for-synthesis forming a composite image further includes:

processing to attenuate amplitude levels of the moving-image data and the image-data-for-synthesis and add the attenuated amplitude levels of the moving-image data and the image-data-for-synthesis.

12. An information terminal apparatus with a moving-image synthesis function, comprising:

an image pickup device which generates a video signal, which includes moving-image data and a moving-image control signal including display timing information of each frame of the moving-image data;

a synthesis processor which receives the video signal and the synthesis processor processes data-for-synthesis recursively;

a storage which stores data-for-synthesis, which includes a plurality of items of image-data-for-synthesis and a plurality of items of control-data-for-synthesis associated with the plurality of items of the image-data-for-synthesis; and a videophone processor which has a function to send composite moving-image data;

wherein the synthesis processor performs the steps of:

reading at least one of the plurality of items of the control-data-for-synthesis from the storage at a timing based on the moving-image control signal when the control-data-for-synthesis includes a repetition count indicating that the control-data-for-synthesis is not repeated and when the control-data-for-synthesis includes a repetition count indicating that the control-data-for-synthesis is repeated, the synthesis processor will use the control-data-for-synthesis that was previously read for a number of successive repetitions of processing data-for-synthesis equal to the repetition count of the control-data-for-synthesis;

analyzing the control-data-for-synthesis which includes pointer information pointing to the next control-data-for-synthesis that is to be read, pointer information pointing to the image-data-for-synthesis that is to be read and the repetition count of current image for synthesis image-data-for-synthesis indicating the number of frames the current image-for-synthesis is displayed;

reading the image-data-for-synthesis from the storage in accordance with the read control-data-for-synthesis from the storage at a timing in accordance with the input timing of the moving-image data when the control-data-for-synthesis includes a repetition count indicating that the image-data-for-synthesis is not repeated and when the control-data-for-synthesis includes a repetition count indicating that the image-data-for-synthesis is repeated, the image-data-for-synthesis will use the image-data-for-synthesis that was previously read for a number of successive repetitions of processing data-for-synthesis equal to the repetition count of the control-data-for-synthesis; and executing processing to synthesize one frame of the moving-image data and the read image-data-for-synthesis forming a composite image.

13. The information terminal apparatus with the moving-image synthesis function according to claim 12, further comprising a data-for-synthesis input section for supplying the storage with the data-for-synthesis.

14. An information terminal apparatus with a moving-image synthesis function, comprising:

a video signal input section which receives a video signal, which includes moving-image data and a moving-image control signal including display timing information of each frame of the moving-image data;

a synthesis processor which receives the video signal and the synthesis processor processes data-for-synthesis recursively;

a storage which stores data-for-synthesis, which includes a plurality of items of image-data-for-synthesis and a plurality of items of control-data-for-synthesis associated with the plurality of items of the image-data-for-synthesis; and an image display section which displays an image based on composite moving-image data;

wherein the synthesis processor performs the steps of:

reading at least one of the plurality of items of the control-data-for-synthesis from the storage at a timing based on the moving-image control signal when the control-data-for-synthesis includes a repetition count indicating that the control-data-for-synthesis is not repeated and when the control-data-for-synthesis includes a repetition count indicating that the control-data-for-synthesis is repeated, the synthesis processor will use the control-data-for-synthesis that was previously read for a number of successive repetitions of processing data-for-synthesis equal to the repetition count of the control-data-for-synthesis;

analyzing the control-data-for-synthesis which includes pointer information pointing to the next control-data-for-synthesis that is to be read, pointer information pointing to the image-data-for-synthesis that is to be read, and the repetition count of current image-data-for-synthesis indicating the number of frames the current image-for-synthesis is displayed;

reading the image-data-for-synthesis from the storage in accordance with the read control-data-for-synthesis from the storage at a timing in accordance with the input timing of the moving-image data when the control-data-for-synthesis includes a repetition count indicating that the image-data-for-synthesis is not repeated and when the control-data-for-synthesis includes a repetition count indicating that the image-data-for-synthesis is repeated, the image-data-for-synthesis will use the image-data-for-synthesis that was previously read for a number of successive repetitions of processing data-for-synthesis equal to the repetition count of the control-data-for-synthesis; and executing processing to synthesize one frame of the moving-image data and the read image-data-for-synthesis forming a composite image.

15. The information terminal apparatus with the moving-image synthesis function according to claim 14, further comprising a data-for-synthesis input section for supplying the storage with the data-for-synthesis.

* * * * *